US010482535B1

(12) United States Patent
 Olson

(10) Patent No.: US 10,482,535 B1
(45) Date of Patent: Nov. 19, 2019

(54) IMPACT DATA MANAGER FOR GENERATING DYNAMIC INTELLIGENCE CUBES

(75) Inventor: Douglas A. Olson, Rosemount, MN (US)

(73) Assignee: AON BENFIELD GLOBAL, INC., Chicago, IL (US)

(*) Notice: Subject to any disclaimer, the term of this patent is extended or adjusted under 35 U.S.C. 154(b) by 0 days.

(21) Appl. No.: 13/493,100

(22) Filed: Jun. 11, 2012

Related U.S. Application Data

(60) Provisional application No. 61/512,390, filed on Jul. 27, 2011.

(51) Int. Cl.
 *G06Q 40/08* (2012.01)
(52) U.S. Cl.
 CPC .................... *G06Q 40/08* (2013.01)
(58) Field of Classification Search
 CPC ............... G06Q 40/00; G06Q 40/08
 USPC ................................ 705/4, 1.1, 35
 See application file for complete search history.

(56) References Cited

U.S. PATENT DOCUMENTS

| 7,949,548 | B2* | 5/2011 | Mathai | G01W 1/00 |
| | | | | 705/35 |
| 8,554,932 | B1 | 10/2013 | Leong et al. | |
| 2003/0149657 | A1* | 8/2003 | Reynolds et al. | 705/38 |
| 2005/0055308 | A1* | 3/2005 | Meyer | G06Q 10/0635 |
| | | | | 705/38 |
| 2007/0214023 | A1 | 9/2007 | Mathai et al. | |
| 2007/0276951 | A1 | 11/2007 | Riggs et al. | |
| 2008/0052137 | A1* | 2/2008 | Ziade | G06Q 40/00 |
| | | | | 705/4 |
| 2008/0133300 | A1* | 6/2008 | Jalinous | 705/7 |
| 2008/0162556 | A1* | 7/2008 | McConnell | G06F 21/552 |
| 2009/0187601 | A1* | 7/2009 | Sengupta | G06F 17/2217 |
| 2010/0280755 | A1 | 11/2010 | Pillsbury et al. | |
| 2011/0213628 | A1* | 9/2011 | Peak | G06Q 40/08 |
| | | | | 705/4 |
| 2012/0123806 | A1* | 5/2012 | Schumann et al. | 705/4 |
| 2014/0019171 | A1* | 1/2014 | Koziol | 705/4 |

(Continued)

OTHER PUBLICATIONS

International Search Report and Written Opinion for PCT Application No. PCT/US2017/059906 dated Feb. 28, 2018.

(Continued)

*Primary Examiner* — William E Rankins
(74) *Attorney, Agent, or Firm* — Gardella Grace P.A.

(57) ABSTRACT

Techniques for dynamically and remotely generating a business intelligence cube from an impact-on-demand or mapping system include an intelligence cube module configured to receive a user indication of a client portfolio stored at a remote mapping system. The module may receive user selections of cube dimensions and boundaries of the client portfolio for inclusion in a draft business intelligence cube definition. The module may validate the selected dimensions and boundaries, determine the presence of any anomalies, and in some cases, automatically modifying the draft to resolve the anomalies. A validated, approved cube definition may be delivered to the mapping system for storage. The mapping system may, in real-time and based on a user request, populate the cube definition with a selected dataset and return the populated business intelligence cube for analysis and utilization in reports and other business intelligence tools.

20 Claims, 14 Drawing Sheets

(56) References Cited

U.S. PATENT DOCUMENTS

2016/0154698 A1  6/2016  Kazi
2016/0173458 A9  6/2016  Alculumbre
2016/0283127 A1  9/2016  Stabrawa et al.
2016/0306699 A1  10/2016  Resch et al.

OTHER PUBLICATIONS

Non-Final Office Action dated Oct. 2, 2014 in U.S. Appl. No. 13/493,095.
Final Office Action dated Apr. 9, 2015 in U.S. Appl. No. 13/493,095.
Advisory Action dated in Sep. 29, 2015 in U.S. Appl. No. 13/493,095.
Non-Final Office Action dated Oct. 26, 2015 in U.S. Appl. No. 13/493,095.
Notice of Allowance dated Jul. 6, 2016 in U.S. Appl. No. 13/493,095.

* cited by examiner

IMPACT DATA MANAGER FOR GENERATING DYNAMIC INTELLIGENCE CUBES

CROSS-REFERENCES TO RELATED APPLICATIONS

The present application claims the benefit of U.S. Provisional Application No. 61/512,390 entitled "Impact Data Manager," which was filed on Jul. 27, 2011, the entire disclosure of which is hereby incorporated by reference.

TECHNICAL FIELD

The present disclosure generally relates to systems and methods of generating dynamic business intelligence cubes from a risk insight and catastrophic event mapping application.

BACKGROUND

Insurance providers generally monitor and track risk events such as hurricanes, earthquakes, tornadoes, wildfires, riots, unrest, hail events, volcanic eruptions, etc. that impact their products (e.g., insurance policies). A system of monitoring events that affect the state of a set of insurance policies may include an application that provides mapping of risk event related data based on information collected from multiple sources. Thus, for example, where a tornado is occurring or has occurred, data on the tornado event may be mapped to a geographic area. In this manner, an insurance provider or other interested party may be able to visualize and gauge its risk exposure via a map. Such a system may be called a mapping system or an impact-on-demand system.

A data collection and data management component may be implemented to manage data upon which the impact-on-demand system operates. For example, a worthwhile feature of such an event/risk mapping system may be the ability to accumulate and incorporate new data relating to the event from multiple sources in an efficient manner to enable basic mapping features such as real-time tracking, and on-demand report generation. However, managing the received data from multiple disparate sources having different formats can be difficult. Moreover, creating certain views based on dynamic data acquisition may require ad-hoc or on-the-fly re-organization of data. Further, in a system in which available data combinations are changing, an efficient process may be needed to recognize when certain fields or combinations of fields are available so that further data manipulation can be more efficient.

SUMMARY

Embodiments of a system for generating dynamic intelligence cubes from an impact-on-demand or mapping system include an intelligence cube module stored on a non-transitory, tangible computer storage medium, a first communicative connection to a user interface, and a second communicative connection to the mapping system. The intelligence cube module may be configured to receive, via the user interface, a user indication of one or more dimensions corresponding to a client portfolio stored at the mapping system. The intelligence cube module may be configured to receive, via the user interface, a user indication of one or more data boundaries which may or may not correspond to a client portfolio. The intelligence cube module may be further configured to perform a validation on at least one of the one or more dimensions and/or at least one of the one or more data boundaries, and to generate a custom intelligence cube definition based on the one or more dimensions and/or the one or more boundaries. The intelligence cube module may cause the custom intelligence cube definition to be delivered, via the second communicative connection, to the mapping system. Upon reception of the custom intelligence cube definition, the mapping system may populate, in real-time, the custom intelligence cube definition based on data corresponding to a selected client portfolio and one or more impact events. The mapping system may deliver the populated cube to the intelligence cube module.

Embodiments of a method of generating dynamic intelligence cubes from an impact-on-demand or mapping system include receiving, via a user interface, an indication of a selection of a client portfolio stored at the mapping system. The method may also include receiving, via the user interface, a user indication of one or more dimensions and/or one or more data boundaries corresponding to the client portfolio and performing a validation of at least one of the one or more dimensions and/or the one or more data boundaries to generate a custom intelligence cube definition. Additionally, the method may include causing the custom intelligence cube definition to be delivered to the mapping system and receiving a populated custom intelligence cube which was populated in real-time from the mapping system, where the populated custom intelligence cube may be based on the customer intelligence cube definition and one or more impact events.

Embodiments of a system for generating dynamic intelligence cubes from an impact-on-demand or mapping system include an intelligence cube module stored on a non-transitory, tangible computer storage medium and a link that communicatively connects the intelligence cube module to the mapping system. The intelligence cube module may be configured to receive, via the user interface, a user indication of one or more dimensions corresponding to a client portfolio stored at the mapping system. The intelligence cube module may be configured to receive, via the user interface, a user indication of one or more data boundaries which may or may not correspond to a client portfolio. The intelligence cube module may be further configured to generate a custom intelligence cube definition based on the one or more dimensions and/or the one or more boundaries, and to cause the custom intelligence cube definition to be delivered, via the link, to the mapping system to be stored. The intelligence cube module also may be configured to cause a user request for a population of the custom intelligence cube definition to be delivered to the mapping system, and the mapping system may be configured to populate the custom intelligence cube in real-time after the request has been received and processed based on data stored at the mapping system and based on one or more impact events. The mapping system may deliver the populated cube to the intelligence cube module.

BRIEF DESCRIPTION OF SEVERAL VIEWS OF THE DRAWINGS

FIGS. 2A-2I include example screen shots illustrating a set of example interactions between a user and a front end of the mapping or impact-on-demand system to generate a dynamic intelligence cube from a portfolio stored at the mapping or impact-on-demand system;

DETAILED DESCRIPTION

Figure 1:
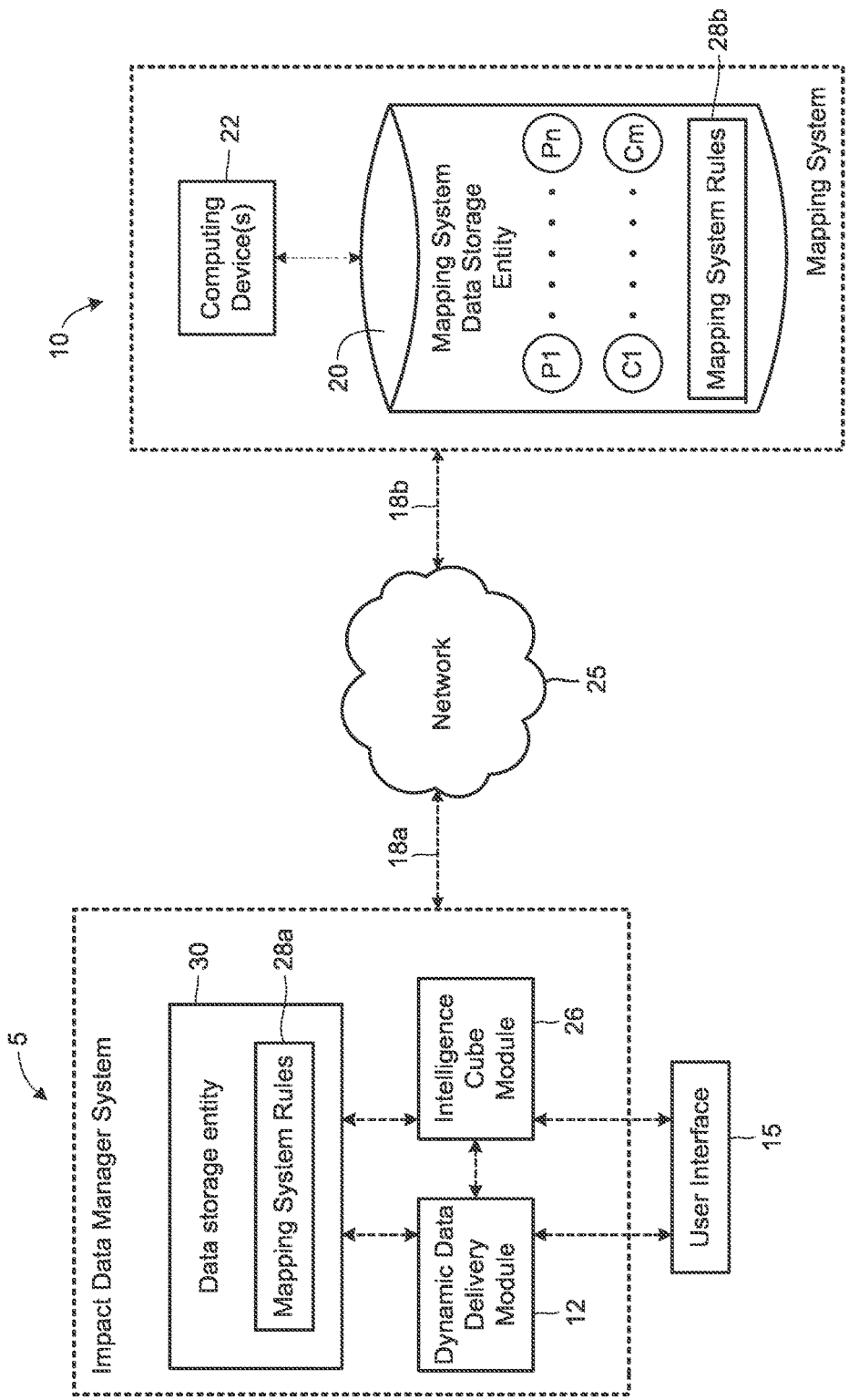
FIG. 1 is a block diagram of an example system for generating dynamic intelligence cubes from a mapping or impact-on-demand system.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

An impact-on-demand system (also referred to interchangeably herein as a "mapping system," an "exposure system," or a "risk management system") generally maps parameters of an impact event to a particular location or geographical area and provides an indication of risk exposure for the particular location or geographical area. Typically, but not necessarily, the risk exposure may be indicated using a map, a chart, a report or other suitable indication. An "impact event" may be any catastrophic event. For example, an impact event may be a weather-related event such as a storm, hurricane, earthquake, tornado, hail storm, volcanic eruption, etc. An impact event may be a natural or man-made disaster such as a wildfire or a flood caused by a dam break. In some situations, an impact event may be societal in nature, such as a riot, terrorism act, or civil unrest. Generally, an impact event may be any risk event that has an ability to impact or affect a physical or geographical area, and, as such, may have an ability to impact or affect real property and/or other insurable or insured properties of interest situated in or around the physical or geographical area.

A client, user or other interested party of the impact-on-demand or mapping system may create or define one or more client portfolios that indicate specific physical or geographical areas of particular interest to the client. In some instances, client portfolios may include indications of real property or other insurable or insured properties of interest to the client where the property is located in, on or by the specific physical or geographical areas (e.g., buildings, factories, farm land, waterways, forests, or other tangible fixed or natural capital). The impact-on-demand or mapping system may provide, as at least a portion of its output, an indication of existing and/or predicted risk to one or more client portfolios as related to one or more impact events. In an example, the impact-on-demand or mapping system may provide a visual map that tracks the impact event over time with respect to a particular client portfolio, and/or the impact-on-demand or mapping system may provide on-demand reports corresponding to the impact event and the client portfolio. Reports may include, for example, predicted or estimated loss, damage, replacement costs, and the like. In some embodiments, output of the impact-on-demand system may be provided to the user on request. In some embodiments, upon reception and processing of a user request, the output of the impact-on-demand system may be generated in real-time and provided to the user. The term "real-time," as used herein, generally refers to virtually immediate responses, without a perceivable delay, and/or within a guaranteed time constraint. For example, when the impact-on-demand system receives a user request, it processes or responds to the request virtually immediately rather than deliberately queuing or storing the request to address at a later time. Generally, in computing systems such as those used by the impact-on-demand system, a real-time response is understood to be generated in the order of milliseconds and sometimes microseconds after reception of a request or event. In contrast, a non-real-time response is a response having a response time that cannot be guaranteed.

As such, a client, user or other interested party may utilize the impact-on-demand or mapping system to better assess the risk of the one or more impact events for risk management or other purposes. The terms "client," "user" and "interested party" of the impact-on-demand or mapping system are used interchangeably herein to refer to a receiver of information (e.g., maps, reports, and other information) that is provided by the impact-on-demand or mapping system. The client may be a computing device, or the client may be a human user of a computing device. In some scenarios, a human client (or the company or organization with which the human client is associated) may have a business relationship with the provider of the impact-on-demand or mapping system, although this is not necessary. In one non-limiting example, a client may be a primary insurance company or a department of an insurance company such as management, product management group, claims department, underwriting department, etc. In another example, the client may be a government disaster or emergency response organization. Other examples of clients that have business or working relationships with the provider of the impact-on-demand system may be possible.

The techniques described herein include systems and methods of generating dynamic, custom business intelligence cubes from client portfolios stored at the impact-on-demand system. As used herein, a "business intelligence cube" (also interchangeably referred to herein as an "intelligence cube" or "cube") may include a customized configuration of data from a client portfolio that is automatically configured based on business intelligence requirements. Typically, but not necessarily, a business intelligence cube does not correspond to an entire client portfolio, but rather is customized to target the subset of the client portfolio data that is able to provide the desired business intelligence. A "business intelligence cube definition," as used herein, describes a definition, template or recipe for configuration of a business intelligence cube. A business intelligence cube definition may be applied to various datasets or client portfolios to generate a populated business intelligence cube. A user may be able to analyze portions of the business intelligence cube as desired, and/or the user may export or extract portions of the business intelligence cube for use in reports, charts, graphs, and/or other business intelligence instruments. The techniques described herein provide for dynamic custom business intelligence cube definition and population so that cubes may be defined, modified and populated dynamically in real-time by a remote user.

A business intelligence cube definition may be generated based on a client portfolio stored at the impact-on-demand or mapping system. In an embodiment, a client portfolio from which a business intelligence cube definition may be generated may include source data that has been stored at the mapping system. The term "source data," as used herein, generally refers to data of interest to the client that is provided to the mapping or impact-on-demand system for generating its output, e.g., maps, reports, risk management assessments, and the like. For example, the source data may include data pertaining to real property or other insurable or insured properties of interest to the client that are locate in, on or by the specific physical or geographical areas (e.g., buildings, factories, arm land, waterways, forests, or other tangible fixed or natural capital). Typically, but not necessarily, the source data may include an indication of a geographical location corresponding to the property of interest to the client. An example of delivery of source data for inclusion and storage in client portfolios is described in U.S. patent application Ser. No. 13/493,095 entitled "Impact Data Manager for Dynamic Data Delivery" and filed on Jun. 11, 2012, the entire disclosure of which is hereby incorporated by reference.

Generally, the techniques described herein may be implemented by an impact data manager in communicative connection with the impact-on-demand or mapping system. As such, the impact data manager may be considered to be a "front-end component," and the mapping system may be considered to be a "back-end component." The front-end and the back-end components may be remotely located, and may communicate via a private network, a public network, or a combination of private and public networks. In some embodiments, more than one impact data manager may be in communicative connection with the impact-on-demand or mapping system, such as in scenarios where multiple clients use the impact-on-demand system and each impact data manager services a different client.

The techniques described herein may allow a user to, while in a disconnected state, prepare a business intelligence cube definition at an impact data manager (e.g., front-end) based on one or more client portfolios stored at an impact-on-demand system (e.g., back-end). The user may select desired data fields, characteristics or categories to create the business intelligence cube definition. The impact data manager may automatically add or otherwise modify parameters or dimensions of the cube based on the selected data fields, and the user may visually inspect the draft intelligence cube definition and make modifications as he or she desires. Upon user approval and indication, the business intelligence cube definition may be delivered to the impact-on-demand system for storage and/or for population. Upon reception and processing of a user request for population of the business intelligence cube definition, the business intelligence cube definition may be populated in real-time by the back-end, and the populated business intelligence cube may be used to generate reports or other business intelligence tools and instruments. Each business intelligence cube may be unique and dynamic based on the data stored at the impact-on-demand system.

FIG. 1 illustrates a block diagram of an example impact data manager 5 front-end in communicative connection with a mapping or impact-on-demand system 10 back-end. The impact data manager 5 may be configured to dynamically deliver source data to the mapping or impact-on-demand system 10. An example mapping or impact-on-demand system including front and back ends may be the ImpactOnDemand® platform developed by Aon Benfield, Inc. The ImpactOnDemand platform includes an ImpactManager, which is one of many possible examples of an impact data manager 5 front-end. In an embodiment, the impact data manager 5 may be a client residing on one or more computing devices, and the mapping system 10 may be a server system residing on one or more computing devices.

In some embodiments, the impact data manager 5 may include an intelligence cube module 26 that is accessible to a user via a user interface 15, and that is configured to generate business intelligence cubes from the mapping or impact-on-demand system 10. In an embodiment, the system 5 may reside on one or more computing devices whose user interface 15 is directly utilized by a user (e.g., via a keyboard, mouse, screen, voice commands, etc.).

In another embodiment, the impact data manager system 5 may be remotely situated from the user and may reside on one or more remote computing devices, servers, cloud computing devices, etc. In this embodiment, the system 5 may be accessible to the user via a user interface 15 of a device that is directly and locally accessible to the user (e.g., a laptop, desktop, wireless device, smart device, etc.) and that is in communicative connection with the system 5. For example, the user interface 15 may include via a rich client (e.g., an executable program) that communicates through a network (not shown) with the impact data manager system 5. The network between the user interface 15 and the impact data manager system 5 may be a private network, a public network (e.g., the Internet), or some combination of public and private networks.

As illustrated in FIG. 1, the intelligence cube module 26 of the impact data manager system 5 may be communicatively connected to the mapping or impact-on-demand system 10 by one or more links 18a, 18b. FIG. 1 illustrates the impact data manager system 5 and the mapping system 10 as being communicatively connected by the links 18a, 18b through a network 25. The network 25 may be, for example, a private network, a public network (e.g., the Internet), or some combination of public and private networks. In some embodiments, though, the impact data manager system 5 and the mapping system 10 need not be communicatively connected through any network, and instead may be locally connected, e.g., when the impact data manager system 5 and the mapping system 10 reside on a same bank of servers or computing devices.

The impact-on-demand system 10 back-end may include a mapping system data storage entity 20 that is accessible to one or more computing devices 22. The mapping system data storage entity 20 may store one or more client portfolios P1-Pn. Each of the client portfolios may indicate a set of properties or geographical locations that are of interest to a client for mapping purposes. For example, a client portfolio may indicate a set of insured real properties in a specific geographical area. In an embodiment, a client portfolio may include any data that may be visualized on a map including, but not limited to data corresponding to weather patterns, terror targets, offshore oil platforms, sinkhole locations, fire stations, migrations of crowds of people (e.g., during rallies, protests, etc.), and other data. Generally, contents of each client portfolio P1-Pn may be defined by a client. The mapping system data storage entity 20 may store multiple portfolios corresponding to one or more clients, in an embodiment.

Although the embodiment shown in FIG. 1 illustrates the data storage entity 20 as being locally accessible to the one or more computing devices 22 of the mapping system 10, in some embodiments, the data storage entity 20 may be remotely accessed by the one or more computing devices 22 via a link and a network (not shown) such as a private network, a public network (e.g., the Internet), or some combination of public and private networks. The mapping system data storage entity 20 may include one or more data storage devices of any known non-transitory, tangible storage media technology (e.g., disks, solid state devices, data banks, servers, cloud storage, etc.) that appear and operate as a single logical data storage device 20. Similarly, the one or more computing devices 22 may include one or more networked computing devices (e.g., stand-alone computing device, one or more servers, cloud computing devices, and the like) that appear and operate as a single logical computing device 22. Each of the one or more computing devices 22 may include a processor, a non-transitory program memory storing computer-executable instructions, a non-transitory random-access memory (RAM), and one or more communication links.

Returning to the impact data manager 5 at the front-end, the intelligence cube module 26 may be communicatively connected with one or more other modules included in the impact data manager 5. For example, the intelligence cube module 26 may be coupled to a dynamic data delivery module 12 for delivering source or portfolio data to the mapping system 10 for storage in one or more client portfolios. Information stored in the client portfolio from the dynamic delivery module 12 may be used to populate one or more business intelligence cubes that are remotely generated at the impact data manager 5. Similar to the intelligence cube module 26, the dynamic data delivery module 12 and/or any other modules may each be communicatively connected to the user interface 15 and to a data storage entity 30 of the impact data manager system 5.

The intelligence cube module 26 may include a set of computer-executable instructions stored on one or more non-transitory, tangible computer-storage media such as a non-transitory memory storage device. The computer-executable instructions may be executable by one or more processors. The one or more processors and the one or more computer-storage media on which the intelligence cube module 26 is stored may or may not reside in a same physical computing device. In a non-limiting embodiment, the one or more processors may be included in a first set of computing devices, and the one or more computer-storage media may be included in a second set of computing devices. Generally, the computer-executable instructions of the intelligence cube module 26, when executed by one or more processors, may allow for dynamic, remote generation of a business intelligence cube based on a client portfolio stored at the mapping system 10. Additionally, the computer-executed instructions of the intelligence cube module 26, when executed by the one or more processors, may allow for a user to interface 15 with the impact data manager 5 during the dynamic generation of the business intelligence cube.

In some embodiments, the intelligence cube module 26 may receive, via the user interface 16, a user selection of a client portfolio stored at the mapping system 10. Based on the received selection, the intelligence cube module 26 may request and obtain information pertaining to the client portfolio from the mapping system 10 for local use at the impact data manager 5. For example, the intelligence cube module 26 may obtain metadata corresponding to the selected client portfolio, or the intelligence cube module 26 may obtain a subset of data or information included in the client portfolio. In some cases, a copy of the entire client portfolio may be obtained. In an embodiment, the intelligence cube module 26 may store (in some cases, temporarily store) the obtained information or data in a local data storage entity 30 or some other suitable data storage entity.

In some embodiments, the intelligence cube module 26 may receive, via the user interface 15, a user selection of one or more dimensions of a client portfolio to be included in a custom business intelligence cube definition. The set of dimensions available for selection may be determined, in some embodiments, by the metadata or information pertaining to the client portfolio that has been received and temporarily stored at the impact data manager 5. A dimension of a client portfolio may correspond to a data field included in the client portfolio, such as Street Address, State, Line of Business, etc. Lists and descriptions of possible data fields of client portfolios may be found, for example, in co-pending U.S. patent application Ser. No. 13/493,095 entitled "Impact Data Manager for Dynamic Data Delivery" filed on Jun. 11, 2012, and the entire disclosure of which is hereby incorporated by reference. Generally, a dimension of a client portfolio may correspond to a category of data in a client portfolio, which may be represented by one or more data fields, column or headers, syntax rules, or other identifying characteristics, labels or tags.

In some embodiments, the intelligence cube module 26 may receive, via the user interface 15, a user selection of one or more boundaries to be included in the custom business intelligence cube definition. The set of boundaries available for selection may be determined, in some embodiments, by the metadata or information pertaining to the client portfolio that has been received and temporarily stored at the impact data manager 5. A boundary of a client portfolio may be any criteria by which data may be filtered. For example, a boundary may correspond to a limit or boundary condition (upper, lower or both) to be applied to data that is to be included in the business intelligence cube, a boundary may correspond to a determination of set membership, a boundary may correspond to a geographical area, and/or a boundary may be an equivalence function. Other types of boundaries may be possible. In an embodiment, a boundary or limit may correspond to a category of data in a client portfolio, which may be represented by one or more data fields, column or headers, syntax rules, or other identifying characteristics, labels or tags, e.g., Policy Premium Amount, Effective Date, Location Limit, etc. In an embodiment, portions of a boundary condition or limit may be at least partially defined by the user, e.g., Policy Limit less than $X, Total Insured Value over $Y, etc. In an embodiment, a boundary may correspond to a numerical or logical operation across multiple characteristics or data fields that defines a limit on the data, e.g., "Policy Limit less than $500,000 and Tornado and Hail Endorsed," "Total Insured Value over $1,000,000 and Policies with an effective date after Jan. 1, 2011," etc.

The intelligence cube module 26 may validate or verify the one or more boundaries and/or the one or more dimensions of the cube definition. In some situations, the intelligence cube module 26 may determine the presence of an anomaly, inconsistency, or incompatibility in the one or more boundaries and/or the one or more dimensions of the cube definition. For example, the intelligence cube module 26 may determine that a boundary limit requires the inclusion of an additional dimension, or the intelligence cube module 26 may determine that none of the data in the client portfolio corresponding to a particular selected dimension is included within the selected boundary conditions. The validation may be performed, for example, based on the information pertaining to the client portfolio received at the impact data manager 5 from the mapping system 10, such as the metadata received from the mapping system 10 or the subset of data included in the client portfolio.

In an embodiment, the intelligence cube module 26 may automatically notify the user of any discrepancies or anomalies. In an embodiment, the intelligence cube module 26 may take corrective action or automatically adjust the source data to resolve the anomaly or inconsistency. For example, the intelligence cube module 26 may bring the anomaly to the user's attention via the user interface 15 and await a user response (e.g., "No data of Dimension Y is within Boundary X") without taking any corrective action. In some scenarios, the intelligence cube module 26 may provide a suggested corrective action along with the notification, and may await an indication of an approval from the user (e.g., "Additional data field Z required to determine Boundary X. Include data field Z in business intelligence cube definition?"). In some embodiments, the intelligence cube module 26 may automatically perform corrections or adjustments without any user notification or input (e.g., automatically adding additional data field Z to the cube definition so that Boundary X may be determined).

In an embodiment, the intelligence cube module 26 may perform the validation or verification based on one or more rules 28*a* corresponding to the mapping system 10. The rules 28*a* may indicate a set of characteristics, limits and/or boundary conditions of data fields and/or contents of data fields corresponding to client portfolios stored at the mapping system 10. The set of rules 28*a* may be a copy of at least a portion of a set of rules 28*b* stored at the mapping system 10 (e.g., stored in the mapping system data storage entity 20). In some embodiments, the set of rules 28*b* may be stored as a "master copy" at the mapping system 10. The mapping system 10 may deliver a copy of at least a portion of the rules 28*b* to the client system 5 via the links 18*a*, 18*b*, and the copy of set of rules 28*a* may be locally stored at the impact data manager system 5 in a local data storage entity 30, so that the intelligence cube module 26 may access the rules 28*a* to perform transformation, validation and/or verification of the business intelligence cube, or other tasks.

In an embodiment, the intelligence cube module 26 may perform the validation of the custom business intelligence cube definition based on both the set of rules 28*a* and based on user input. For example, the user may modify or make one or more exceptions to the rules 28*a*. In another example, the user may define an additional rule to use during the validation process.

The intelligence cube module 26 may perform the validation of the custom business intelligence cube definition based on look-ahead technology or features, in an embodiment. For example, the mapping system 10 may analyze data fields and, based on the analysis, may dynamically make changes to the functionality and/or display choices available to the user. As such, if certain data exists within the data set, the mapping system 10 may cause extra "look ahead" functionality to be presented or executed. Examples of look-ahead features may include (but are not limited to) geo-coding (e.g., when the required data fields are addressed-based), thematic shading (e.g., geographical shading on a map based on county or other location), quick exposure calculations (e.g., detailed calculation of exposed limits for included data), risk analysis, single risk modeling, and the like. As another example, a look-ahead feature may providing a set of possible functions (e.g., exporting, creating a filter, etc.) if underlying data exists when a particular data field is selected (e.g., right-clicking on the data field). In some embodiments, to support desired look-ahead features, the intelligence cube module 26 may determine if certain additional information needs to be included in custom business intelligence cube definition. In these embodiments, the intelligence cube module 26 may automatically provide or enable extra menus, features, fields and calculations to generate and/or modify one or more dimensions and/or boundaries as required by the look-ahead technology. In an embodiment, the desired look-ahead features may be indicated by the user.

In some embodiment, the intelligence cube module 26 may provide, at the user interface 15, a visual indication of the business intelligence cube definition as it is being created and modified. For example, after each selection or indication of a particular dimension or particular boundary, a visual indication of intelligence cube definition may be updated to reflect the most recent selection or indication. If a user removes a particular dimension from the cube definition, or removes or modifies a particular boundary of the cube definition, the visual indication of the custom business intelligence cube definition may be updated to reflect each change as it is indicated by the user.

Once the custom business intelligence cube definition has been validated or verified, in an embodiment, the intelligence cube module 26 may encrypt and/or compress the cube to prepare the cube definition for delivery to the mapping system 10. Encryption and compression may be user-selectable, in an embodiment. The intelligence cube module 26 may cause the cube definition (whether encrypted or non-encrypted, and/or compressed or non-compressed) to be delivered to the mapping system 10 via the link 18*a*. In an embodiment, the custom business intelligence cube definition may be delivered to the mapping system 10 via a proprietary delivery system. In an embodiment, delivery of the custom business intelligence cube definition to the impact-on-demand system 10 using the impact data manager 5 may be an automated process that uploads or delivers multiple business intelligence cube definitions from multiple sources for storage at the mapping system 10.

The mapping system 10 may receive the custom business intelligence cube definition from the impact data manager 5, and may store the custom business intelligence cube definition in a data storage entity that is accessible to the mapping system 10, such as the data storage entity 20 or other suitable data storage entity. One or more of the business cube definitions C1-Cm generated at one or more different impact data managers 5 may be stored at the mapping system 10.

In an embodiment, a user may make a request of the mapping system 10 via the impact data manager 5 to populate a stored custom business intelligence cube definition. The mapping system 10 may populate the custom intelligence cube definition according to the dimensions and boundaries of the definition. In particular, the mapping system 10 may, in real-time, retrieve data from a selected dataset according to the dimensions and boundaries, populate the cube definition to form a populated business intelligence cube, and return the populated cube to the impact data manager 5. The dataset may correspond to the client portfolio based on which the business intelligence cube definition was generated, or the dataset may correspond to a different client portfolio. In an embodiment, the population of the cube definition may be based on one or more impact events, e.g., a predicted hurricane or wild fire path, an earthquake, etc. In an embodiment, the request to populate the custom business intelligence cube definition may be transmitted to the impact-on-demand system 10 in conjunction with the initial cube definition.

FIGS. 2A-2I illustrate an example set of interactions between the impact data manager 5 and the user interface 15 to generate and deliver client source data to an impact-on-demand system 10. Each of the FIGS. 2A-2I illustrates a different screen shot that may be displayed on the user interface 15. In embodiments with the impact data manager system 5, the intelligence cube module 26 may be configured to cause the screens of FIGS. 2A-2I (or the information therein) to be presented at the user interface 15. Indications of user inputs may be received at the user interface 15 and may be delivered to the intelligence cube module 26 of the impact data manager 5 for processing. While FIGS. 2A-2I are described below in conjunction with the impact data manager system 5 and the impact-on-demand or mapping system 10 of FIG. 1, any or all of FIGS. 2A-2I may be used conjunction with other suitable systems.

Figure 2A:
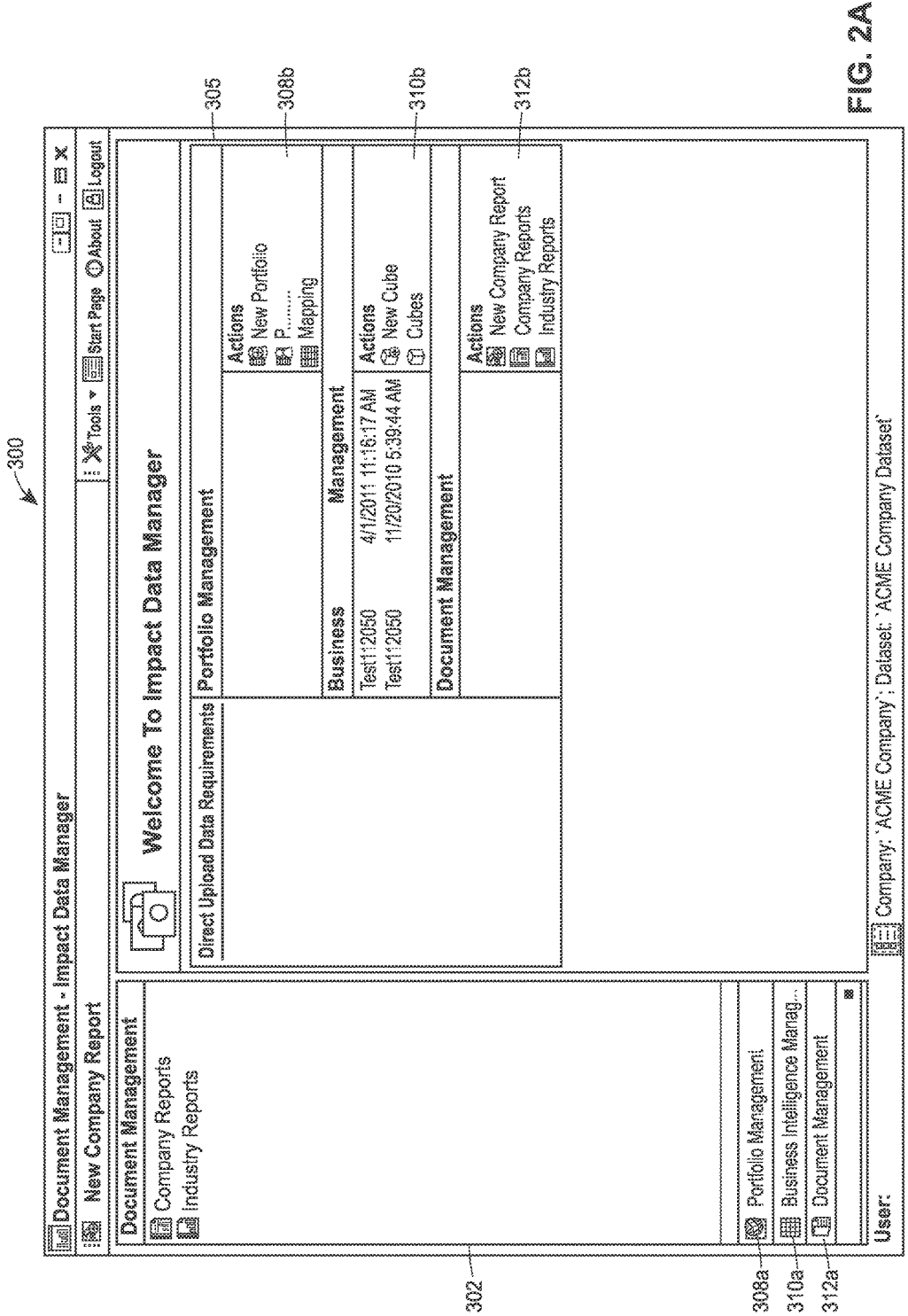

FIG. 2A depicts an example screen shot 300 (e.g., a "home" or "welcome" screen 300) that may be displayed when a user initially accesses the impact data manager system 5 via the user interface 15. In an embodiment, the impact data manager 5 may require permission-based access, e.g., using a login/password combination, biometric identifier, or other secured access mechanism.

In an embodiment, the home screen 300 may be partitioned into multiple areas 302, 305. A first area 302 of the screen 300 may include a display of selectable user controls 308a, 310a, 312a corresponding to high-level management functions that are provided via the impact data manager 5. For example, the impact data manager system 5 may provide a portfolio management function 308a, a business intelligence management function 310a, a document management function 312a, and/or any number of other high-level management functions (not shown). A second area 305 of the screen 300 may include a display of selectable user controls 308b, 310b, 312b for sets of actions that respectively correspond to each of the high-level data management functions 308a, 310a, 312a. Of course, the display of the high-level management functions 308a-312a in the screen portion 302 and corresponding actions 308b-312b in the screen portion 305 is not limited to the arrangement 300 shown in FIG. 2A. Other arrangements of presentation formats are also possible, for example, one or three or any other number of areas may be displayed on the screen 300, the information displayed on the screen 300 may be displayed on a series of screens instead of on a single screen, the high-level management functions 308a-312a and/or the respective sets of actions 308b-312b may be presented in one or more drop-down selection menus or one or more pop-up selection menus or other suitable presentation formats, etc. In the example scenario, the intelligence cube module 26 may receive indications of a user selection of the Business Intelligence Management function 310a and the action New Cube 310b. By this selection combination, the user indicates to the impact data manager 5 that he or she desires to generate a new business intelligence cube to be stored at and populated by the mapping system 10.

Figure 2B:
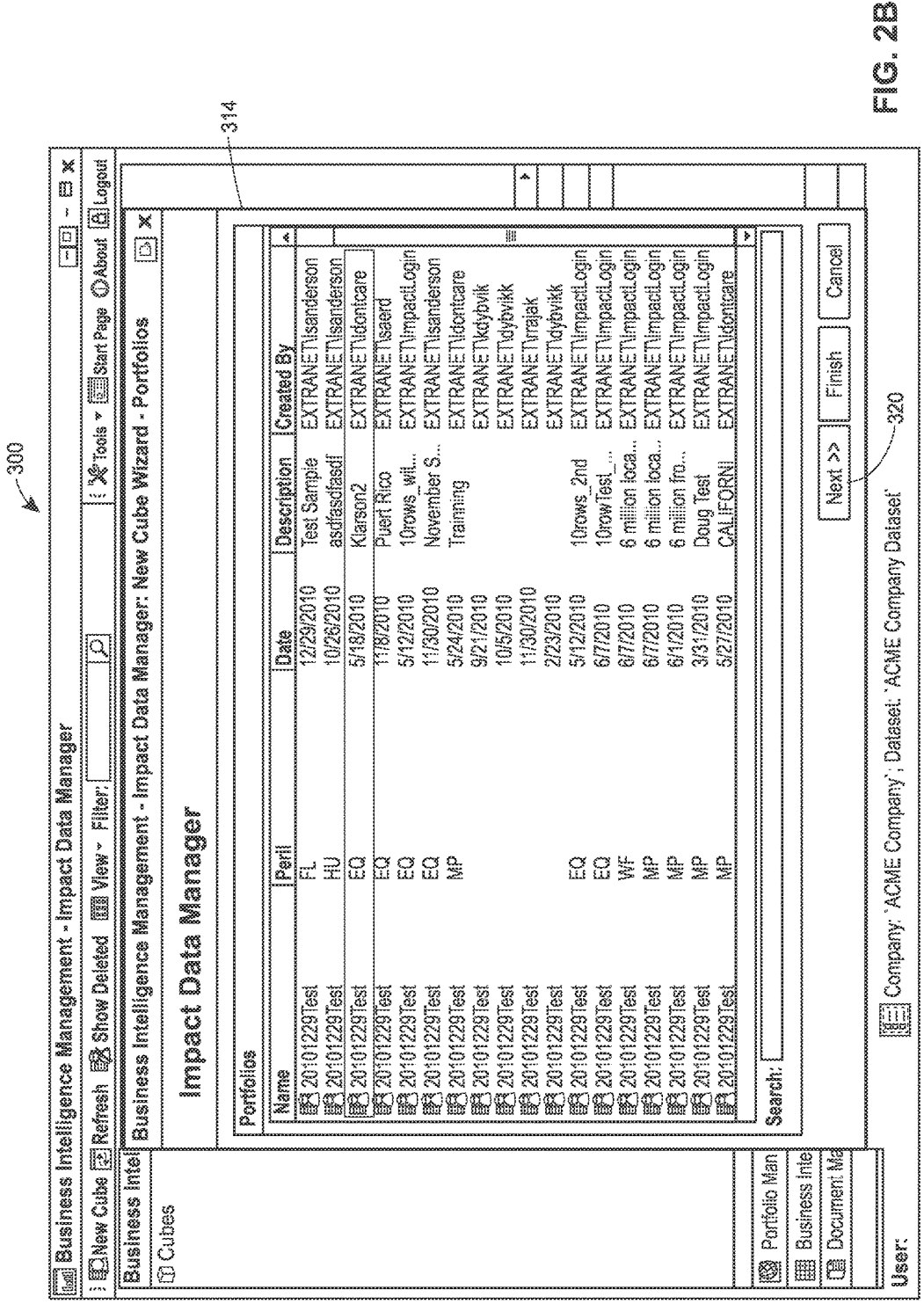

The system 5 may respond to these user selections by displaying a portfolio selection screen 314 as shown in FIG. 2B. The screen 314 may include a display of one or more available client portfolios that are stored at the mapping system 10. In an embodiment, the available client portfolios correspond to a login or other identification of the user. Typically, but not necessarily, each of the client portfolios displayed on the screen 314 may include source data that was previously delivered to the mapping system 10 by an impact data manager 5. The user may select a desired client portfolio (indicated on FIG. 2B by the selection box), and may select the "Next" user control 320 or other suitable user control to continue.

Figure 2C:
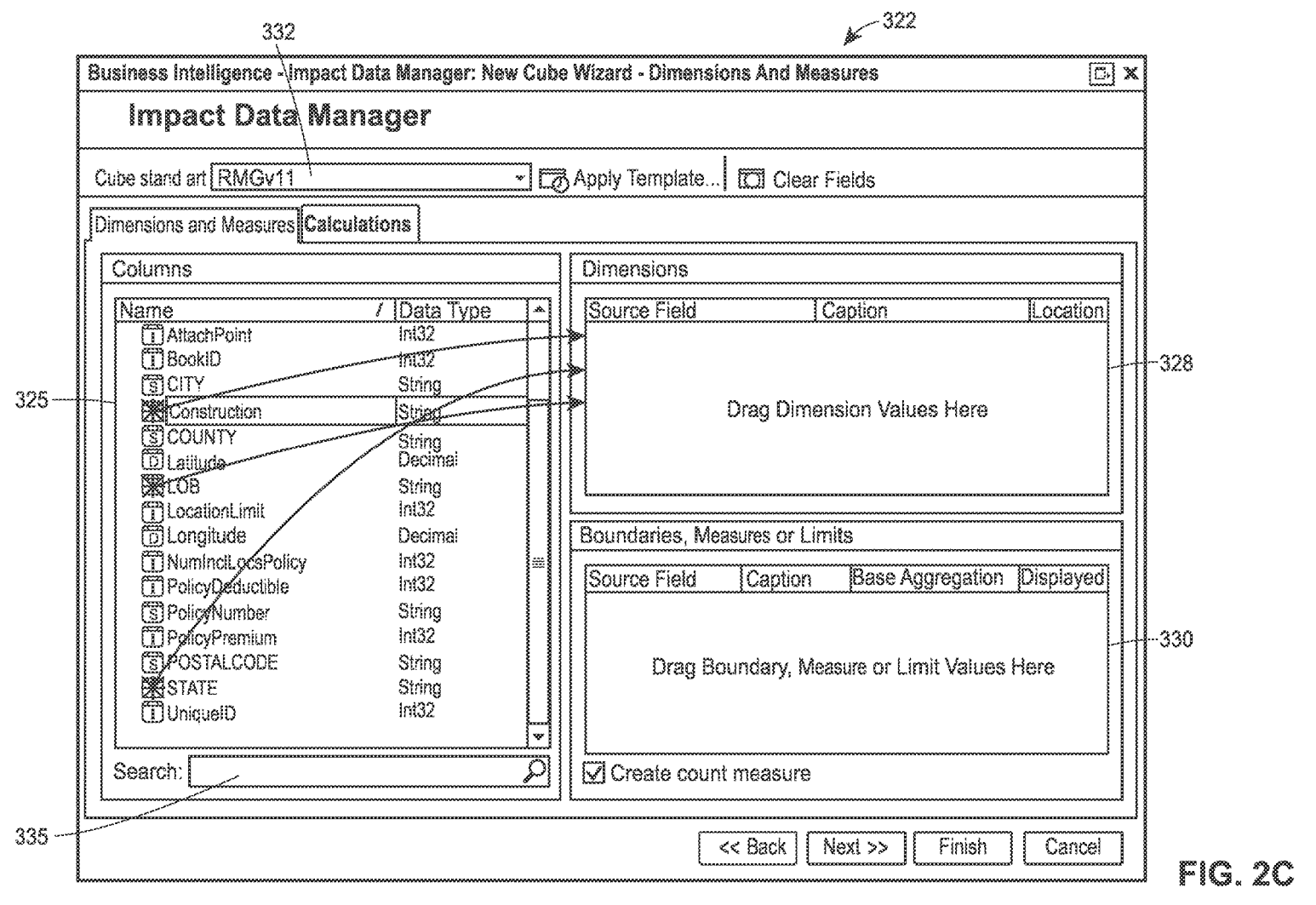

Turning to FIG. 2C, upon receiving the indication of the selected portfolio, the impact data manager 5 may obtain at least some of the information corresponding to the selected portfolio from the mapping system 5. For example, the intelligence cube module 26 at the impact data manager 5 may obtain a set of metadata corresponding to the selected client portfolio from the mapping system 10. The impact data manager 5 may present a window or screen 322 via which the user is able to create a custom business intelligence cube definition. The window 322 may include a first portion 325 in which the information corresponding to the selected portfolio and obtained from the mapping system 5 may be displayed. In the example shown in FIG. 2C, the information includes column headers used in the client portfolio, but other identifications or portions of the selected client portfolio may be additionally or alternatively displayed.

The window 322 may include a second portion 328 to indicate dimensions of the custom business intelligence cube definition, whether selected by the user or automatically generated by the intelligence cube module 26. The window 322 may include a third portion 330 to indicate boundaries or limits for the custom business intelligence cube definition, whether selected by the user or automatically generated by the intelligence cube module 26. Additionally, the window 322 may include a selection mechanism 332 such as a drop-down menu or other suitable mechanism to indicate a standard template for the definition, if desired by the user. In the example shown in FIG. 2C, some of the options for templates may be pre-defined, and some of the options for template may have been custom-defined by the user a priori.

To indicate a selection of a dimension or a boundary, a user may use a selection indication such as a drag-and-drop action, copy/paste sequence, or other suitable selection indication mechanism. The user may directly select an entry or data field from the first screen portion 325, or the user may use a search function 335 to find a desired entry or data field. In the example scenario shown in FIG. 2C, the user has selected the data fields Constructions, State and Line of Business (LOB) to be dimensions of the custom business intelligence cube definition, and is in the process of dragging and dropping the selected data fields from the first portion of the screen 325 to the dimensions portion 328 of the screen 322, as indicated by the arrows.

Figure 2D:
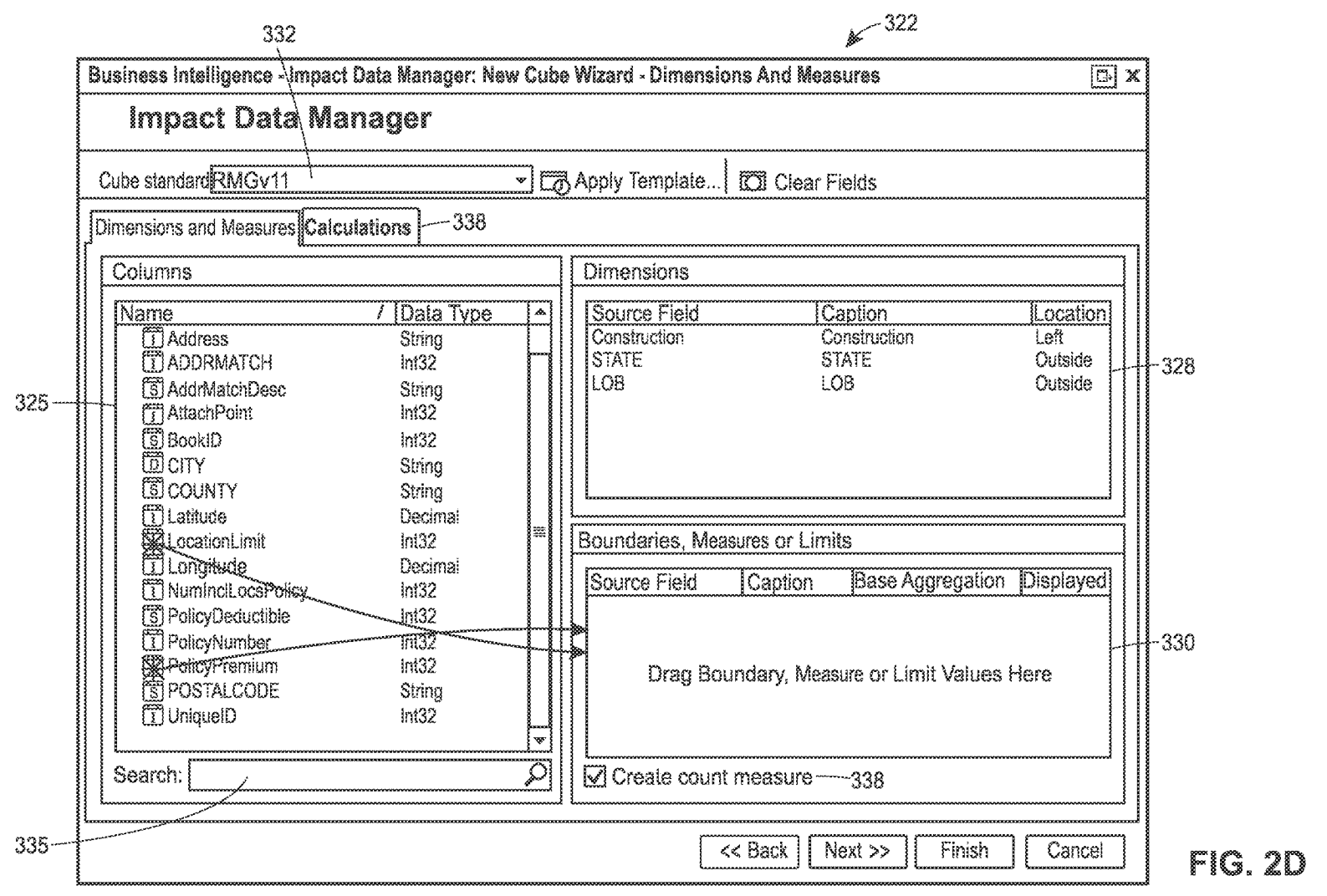

FIG. 2D shows the screen 322 after the dimension selection of FIG. 2C has completed. The dimension portion 328 of the screen 322 indicates the selected data fields Construction, State and LOB are to be included as dimensions in the cube definition. In FIG. 2D, the user has selected two data fields PolicyPremium and LocationLimit to be boundaries, limits or measures of the custom business intelligence cube definition, and is in the process of dragging and dropping the selected data fields from the first portion of the screen 325 to the boundaries portion 330 of the screen 322, as indicated by the arrows. In FIG. 2D, the user has selected the "create count measure" control 338, which will cause a count of records within the cube to be automatically generated.

Figure 2E:
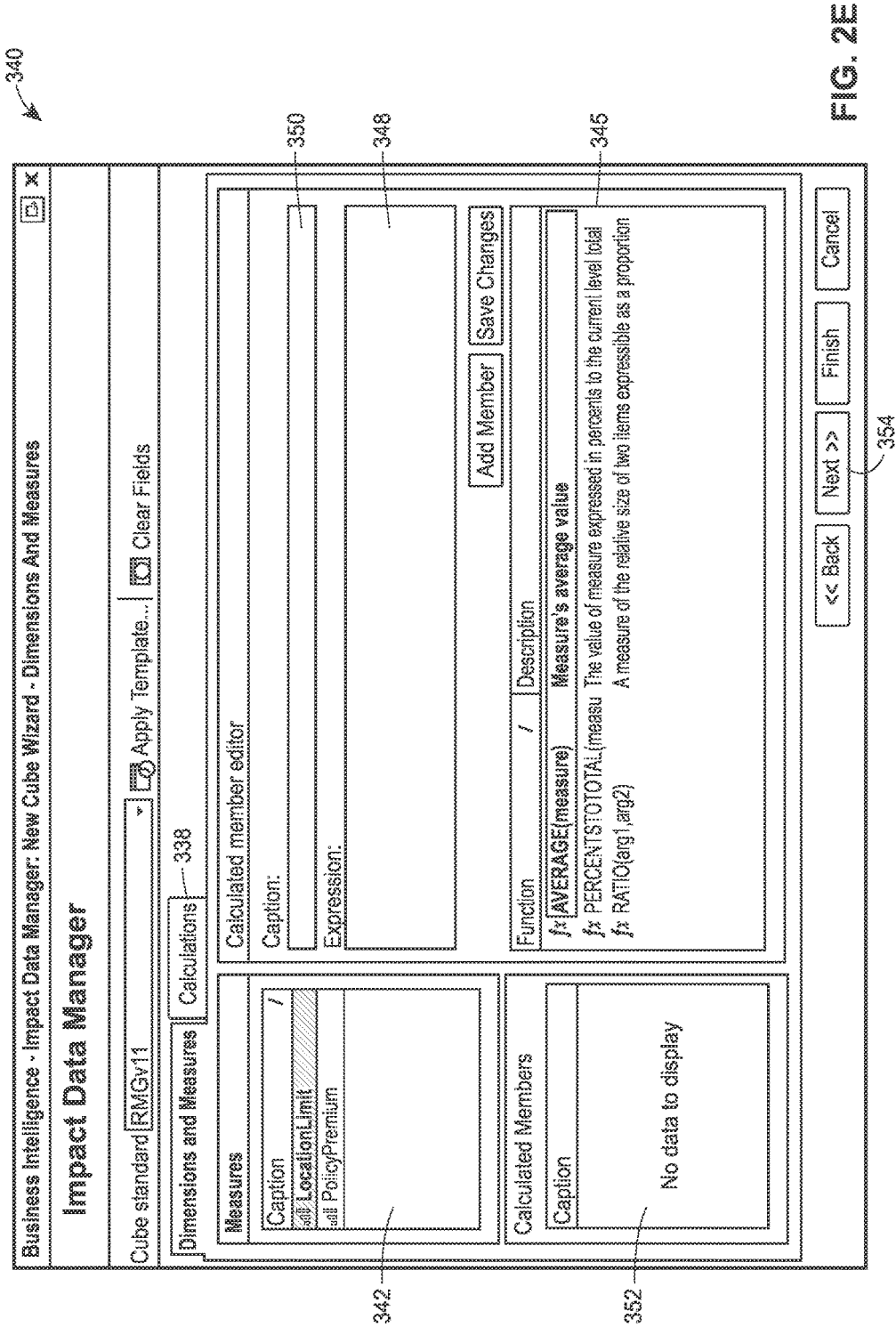

If the user desires to create a custom boundary or measure, the user may select a calculations user control 338 or other suitable user control. FIG. 2E shows the screen 322 after the user has selected the calculations control 338. A window or dialog box 340 may be displayed via which the user may define one or more custom boundaries or limits to be included in the cube definition. The window 340 may include a first portion 342 which indicates the selected boundaries from the previous screen 332 (e.g., from the boundary portion 330 of the screen 322 of FIG. 2D). A set of selectable, commonly used formulas or calculations may be displayed in a second portion 345 of the screen 340 for user selection. If the user desires to include a custom formula or calculation, he or she may define the custom formula or calculation in a third portion 348 of the screen 340, and may name or identify the custom formula or calculation in a fourth portion 350 of the screen 340. Any manually defined boundaries or limits from the screen portions 345 and 348 may be cumulatively identified in a fifth portion 352 of the screen 340. When the user has finished defining the custom formula(s) or calculation(s), the user may indicate as such by selecting the "Next" user control 354 or other suitable user control.

It is noted that as the user adds, subtracts or modifies elements to portions of the screen 322 of FIG. 2D and/or the screen 340 of FIG. 2E, the visual indicator of the cube definition displayed on the user interface 15 may be visually updated accordingly after each user-initiated change. The intelligence cube module 26 may perform a validation on each change that the user indicates. In an embodiment, the validation may be performed sequentially, e.g., each time the user makes a change to the cube definition, a corresponding validation may be performed by the intelligence cube module 26.

In an embodiment, rather than sequentially validating each of a plurality of changes, the validation may be performed on a collective set of multiple changes to the cube definition. For example, the user may perform multiple changes to the draft cube definition, and the user may direct the intelligence cube module 26 to perform a validation when the user is satisfied with the draft custom cube definition by selecting a "Validate" user control (not shown). Upon receiving the selection of the "Validate" control, the impact data manager 5 may automatically validate the dimensions 328 and the boundaries 330, 345, 352 of the draft intelligence cube definition. In an embodiment, the validation may be performed based on one or more rules 28a corresponding to the selected client portfolio.

If an anomaly or discrepancy is detected during the validation process, the intelligence cube module 26 may indicate as such using a pop-up window or other indicator on the screen 322 and/or the screen 340. In some embodiments, the intelligence cube module 26 may wait for an indication of a user instruction to resolve the anomaly or discrepancy, e.g., a removal, addition, modification or substitution of a dimension, boundary, or custom boundary. In some embodiments, the impact data manager 5 may automatically correct any anomalies or errors found during the validation process and may indicate such automatic corrections to the user.

Figure 2F:
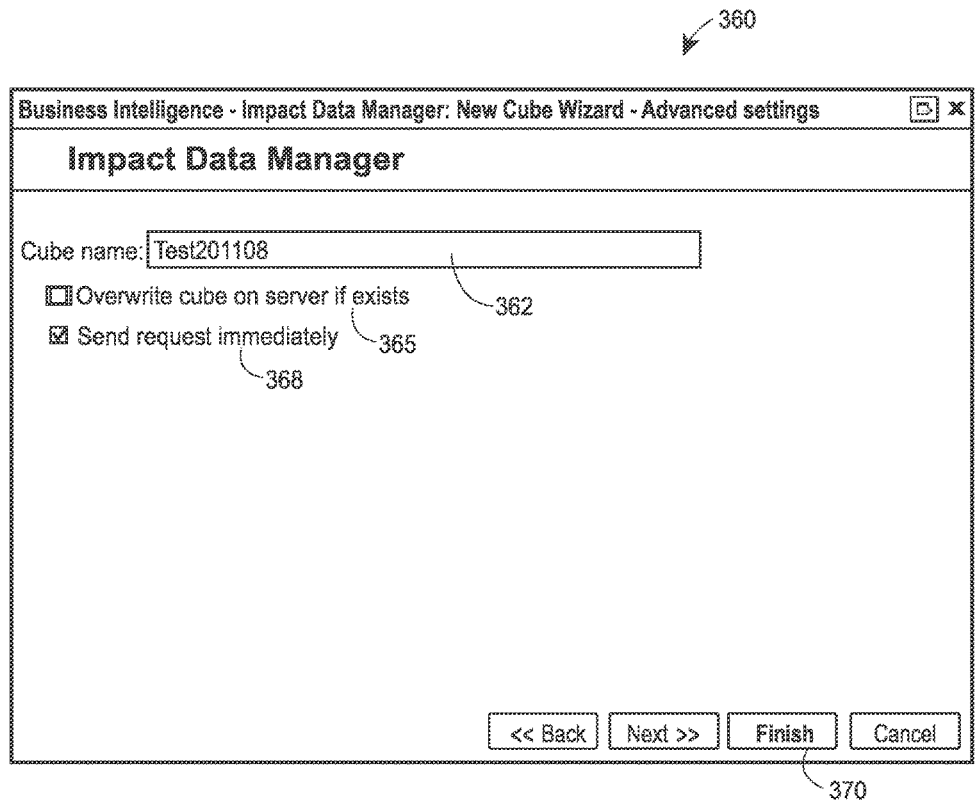

FIG. 2F depicts a cube identification screen 360 via which the user may provide identification of the custom business intelligence cube definition that is to be stored at and populated by the mapping system 10. The user may indicate, for example, a portfolio identification or name 362, and an indication 365 of whether or not to overwrite an existing cube at the mapping system 10. The user may indicate that the cube definition has been named by activating a "Finish" user control 370. The user may indicate whether or not the cube definition is to be sent immediately 368 or is to be queued for later delivery to the mapping system 10. In an embodiment, the business intelligence cube definition may be delivered to the mapping system 10 using an XML format or another suitable format.

Figure 2G:
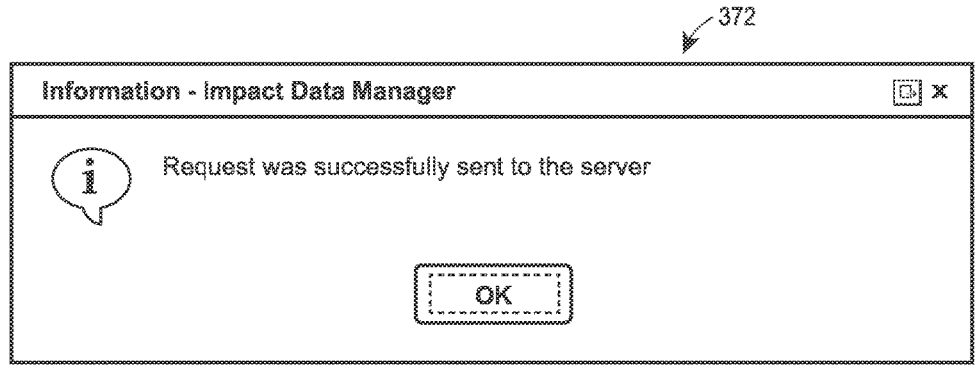

The mapping system 10 may receive the business intelligence cube definition and may store the definition, e.g., in the storage entity 20. Along with the cube definition, the mapping system 10 may also store associated metadata, user name and other identification indicia, and security permissions. The mapping system 10 may return an indication of the result of the cube definition delivery 372 to the impact data manager 5, and the impact data manager 5 may display the result on the user interface 15, as shown in FIG. 2G.

Figure 2H:
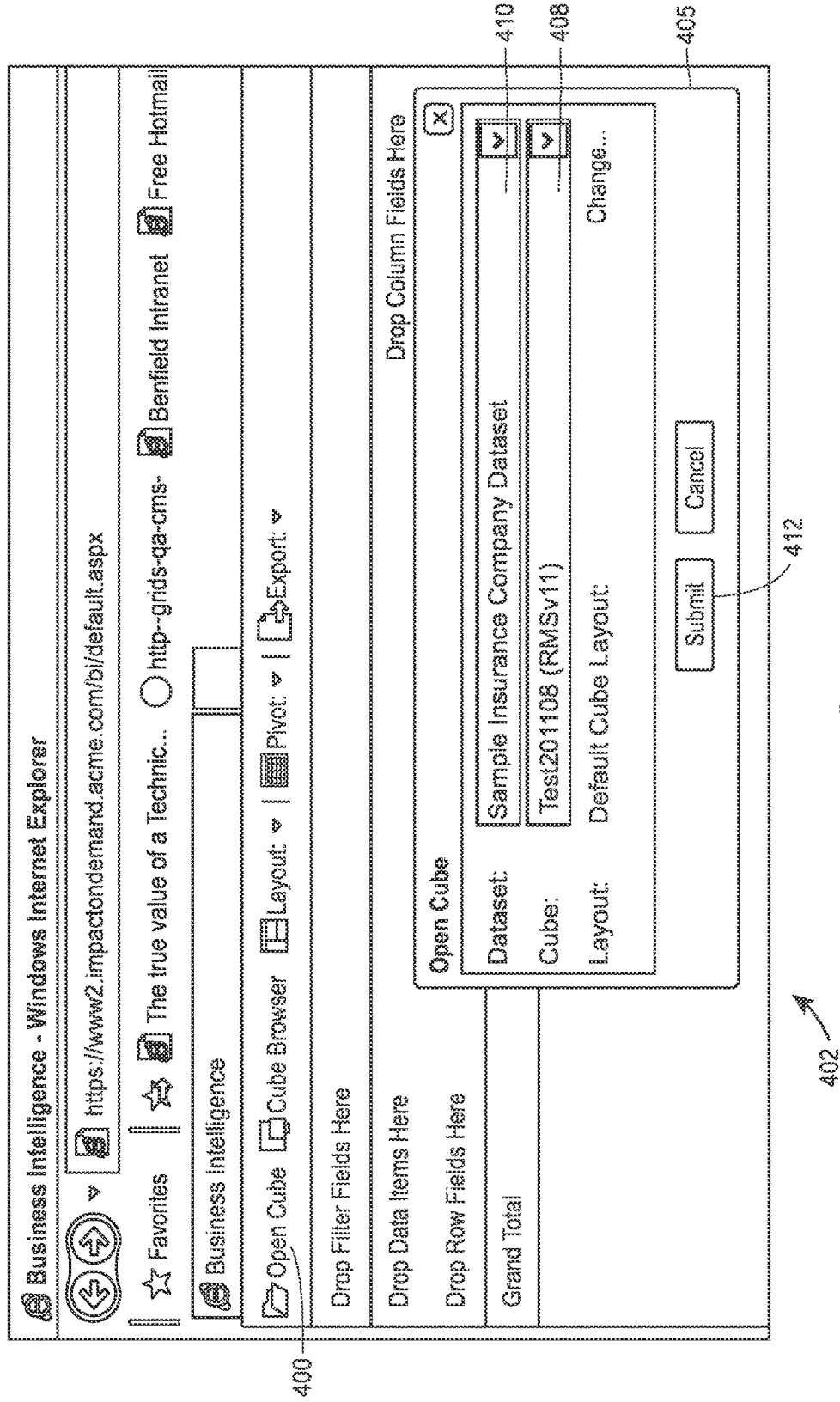
Figure 2I:
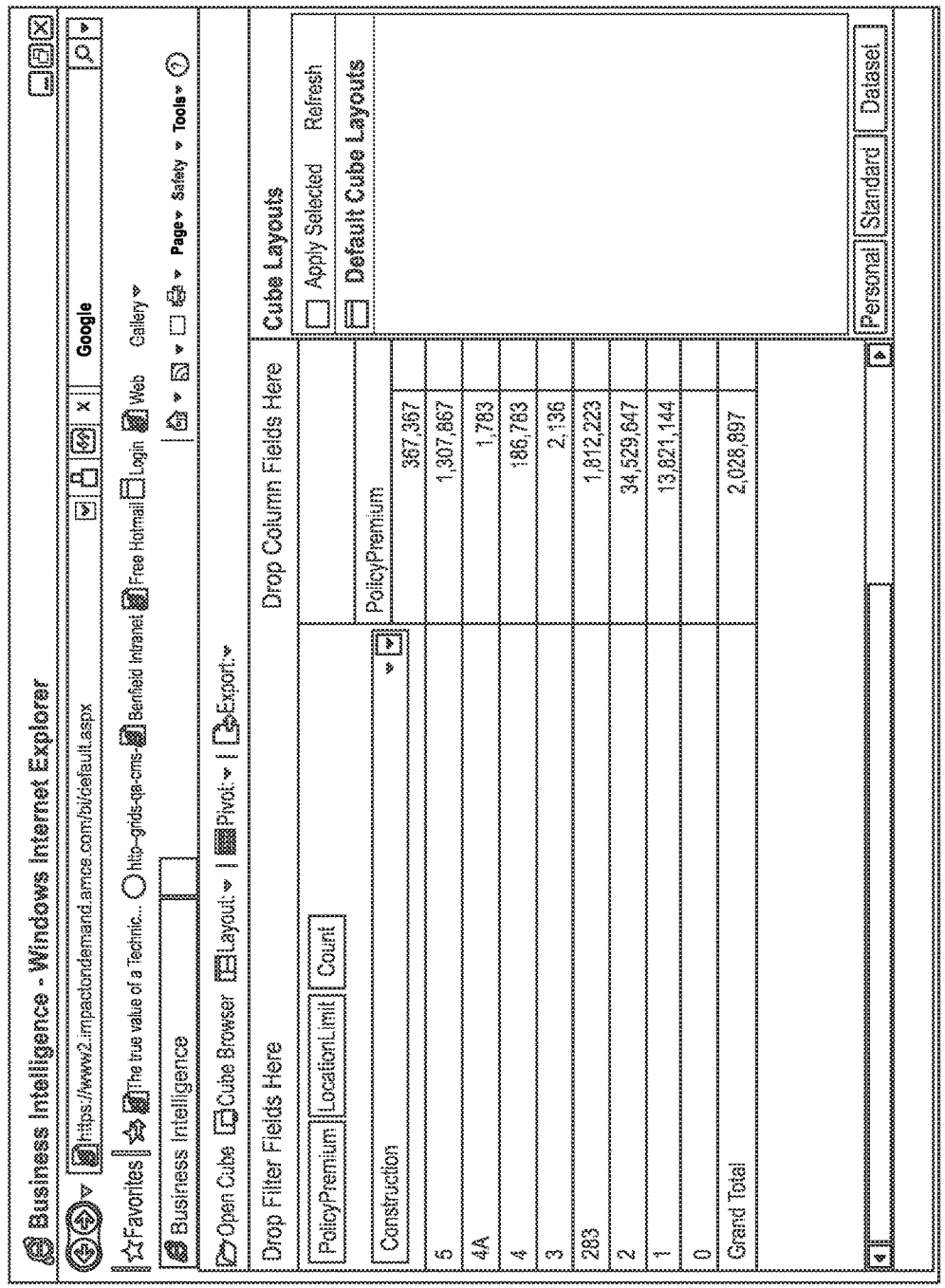

FIG. 2H illustrates an example scenario of a user requesting a population of a particular business intelligence cube. The user may indicate the request by activating an "Open Cube" control 400 or other suitable control. The "Open Cube" control 400 may be included, for example, in a set of business intelligence user controls 310b on a home screen 300 as shown in FIG. 2A. In another example, the "Open Cube" control 400 may be included on a different screen 402 related to business intelligence. Upon activation of the "Open Cube" control 400, a user dialog box 405 may appear. The user may indicate the desired cube definition 408 and a dataset 410 to which the cube definition 408 is to be applied. The dataset 410 may correspond to the client portfolio on which the cube definition 408 is based, or the dataset may correspond to another client portfolio.

Upon selection of the "Submit" control 412 or other suitable control indicating that the desired parameters have been correctly indicated, the impact data manager 5 may send the request to the mapping system 10 for fulfillment. The mapping system 10 may retrieve the stored cube definition and may populate, in real-time, the definition with appropriate data from the selected dataset 410. In an embodiment, the cube definition may be populated additionally based on one or more impact events, such as a hurricane path or an earthquake location. The populated business intelligence cube may be returned to the impact data manager 5 for display, as shown in screen 420 of FIG. 2I.

In an embodiment, the "Submit" control 412 may be included in the cube identification screen 360, so that a finalized definition of the cube is delivered to the impact-on-demand system 10 in conjunction with a request for its population.

Via the user interface 15, the user may be able to view and to utilize a portion or all of the populated business intelligence cube 420 to analyze desired portions of the dataset 410. In an embodiment, at least some portions of the populated business intelligence cube 420 may be used to generate one or more reports, graphs, charts, or other business intelligence tools. For example, a first report may include information from a first portion of the populated business intelligence cube 420, and a second report may include information from a different portion of the populated business intelligence cube 420. Any of the business intelligence tools that are generated based on the populated business intelligence cube 420 may be displayed on the user interface 15.

Figure 3:
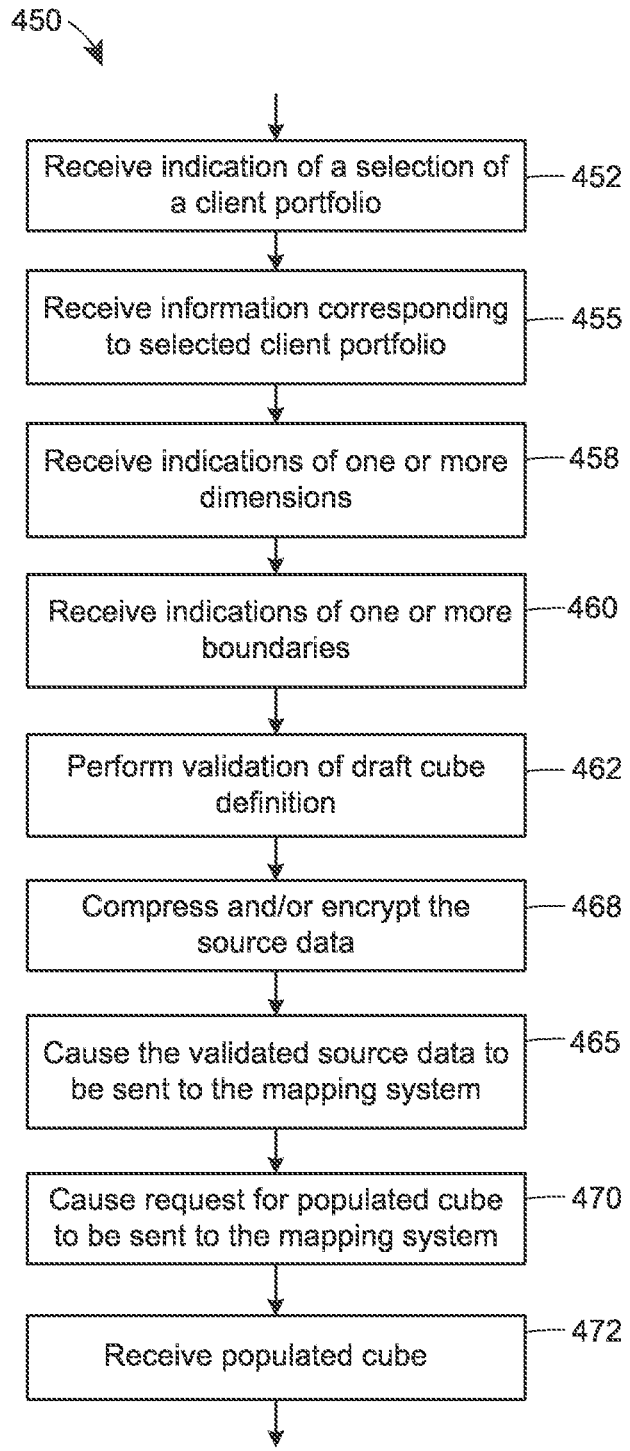
FIG. 3 is an example method for generating dynamic intelligence cubes from a mapping or impact-on-demand system.

FIG. 3 is an example method 450 for remotely generating dynamic intelligence cubes from mapping or impact-on-demand system. Although the method 450 is described in conjunction with the impact data manager system 5 and the mapping system 10 of FIG. 1, the method 450 may operate in conjunction with other suitable systems. Some or all portions of the method 450 may operate in conjunction with by any or all of the screens discussed with respect to FIGS. 2A-2I.

The method 450 may include receiving an indication 452 of a selected client portfolio. For example, an impact data manager 5 or an intelligence cube module 26 included in the impact data manager 5 may receive an indication of a client portfolio 452 via a user interface 15. The client portfolio may be stored remotely at an impact-on-demand system 10.

At a block 455, information corresponding to the selected client portfolio may be received. Typically, but not necessarily, the entire contents of the selected client portfolio are not received to optimize bandwidth and response time. Rather, only a portion of data corresponding to the selected client portfolio may be received 455. In an embodiment, metadata corresponding to the selected client portfolio may be received 455 at the impact data manager 5 from the mapping system 10. In an embodiment, a subset of information or data included in the client portfolio may be received 455.

At a block 458, an indication of one or more dimensions corresponding to the selected client portfolio may be received, and at block 460, an indication of one or more boundaries or limits to be applied to the dimensions or data may be received. For example, the indication of the one or more dimensions and/or the indication of the one more boundaries or limits may be received at the impact data manager 5 via the user interface 15, and may be incorporated into a draft of the custom business intelligence cube definition.

At a block 462, a draft of the custom business intelligence cube definition may be validated. In an embodiment, the intelligence cube module 26 may perform a validation of at least a portion of the draft of the custom business intelligence cube definition. For example, a validation of the one or more dimensions and/or on one or more boundary conditions or limits may be performed 462. In an embodiment, the validation may be based on at least one rule corresponding to the selected client portfolio, such as the rules 28a. In an embodiment, a user may indicate a rule (in addition or instead of those included in the at least one of the rules 28a) that is to be used in the validation process. In an embodiment, the types of validation to be performed 462 may be at least partially selected by a user.

At the block 462, if the presence of an anomaly or error is discovered or determined, a correction or adjustment to the draft cube definition may be applied or performed. In an embodiment, the intelligence cube module 26 may discover an anomaly or error, and the intelligence cube module 26 may automatically make a correction or apply an adjustment 460 to the draft cube definition based on the anomaly or error. In some embodiments, a correction or adjustment may be performed only after user approval for the correction or adjustment is received.

At a block 465, the validated, custom business intelligence cube may be caused to be delivered to the mapping system 10. In an embodiment, the intelligence cube module 26 may cause the validated, custom business intelligence cube to be delivered from the impact data manager system 5 to the mapping system 10 via the links 18a, 18b to be stored at the mapping system 10. In some embodiments, the validated, custom business intelligence cube may be encrypted, compressed, or both encrypted and compressed 468 prior to being caused to be delivered 465 to the mapping system 10.

In some embodiments, optional blocks 470 and 472 may be included in the method 450. In these embodiments, at the block 470, a request for a populated cube may be caused to be sent. For example, a user request to populate a particular cube definition with a particular dataset may be caused to be sent or transmitted to the mapping system 10 from the impact data manager 5. The particular dataset may or may not correspond to the same client portfolio on which the particular cube definition was based.

Upon receiving and parsing or processing the request, the mapping system 10 may, in real-time, populate the indicated, particular cube definition with corresponding portions of the particular data set, and may return the populated cube to the impact data manager 5. The population of the particular cube definition may be performed, for example, based on one or more impact events.

Figure 4A:
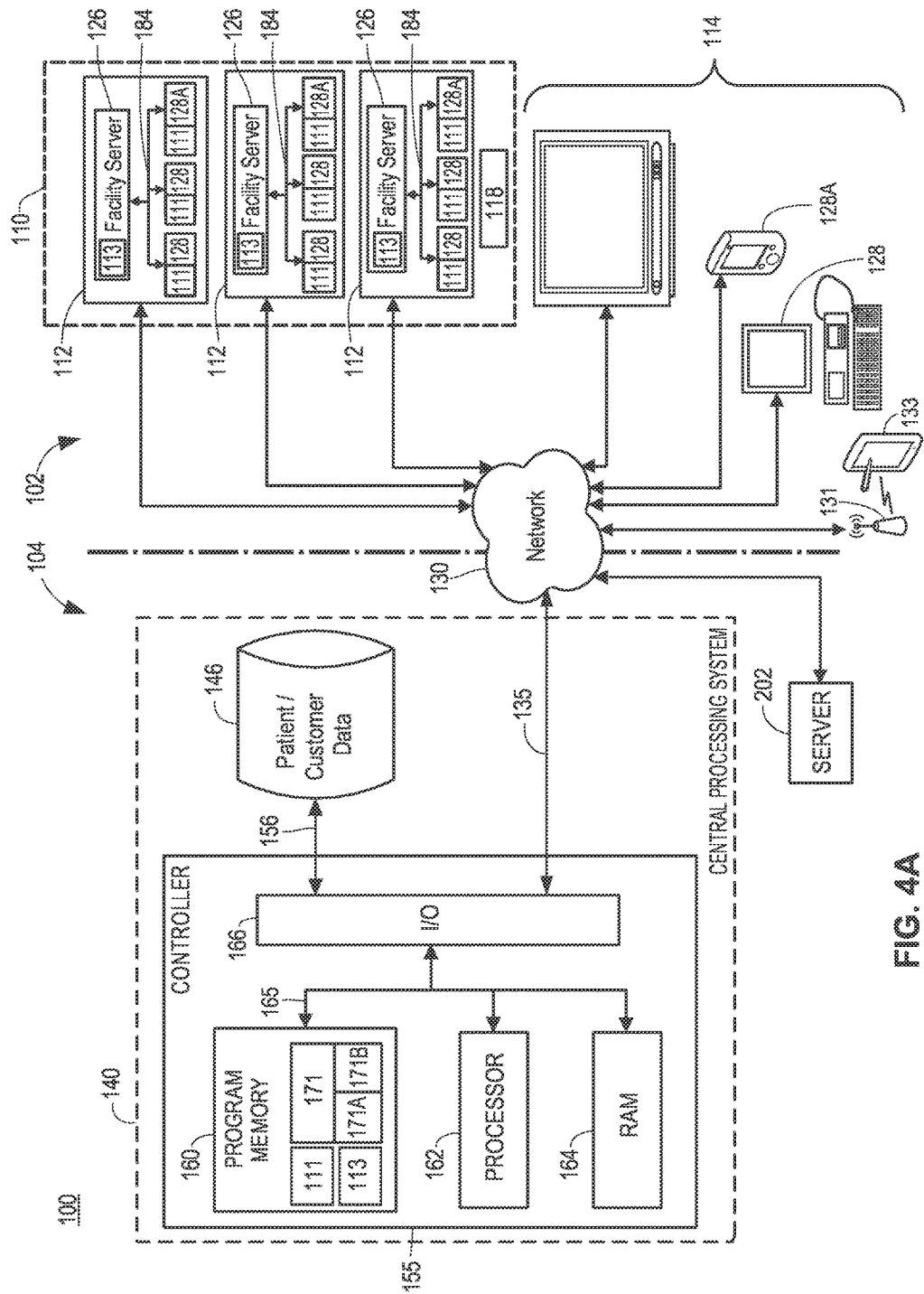
FIGS. 4A-4D each illustrates various aspects of an exemplary architecture implementing an impact data manager and/or an impact-on-demand or mapping system including dynamic intelligence cube generation.
Figure 4B:
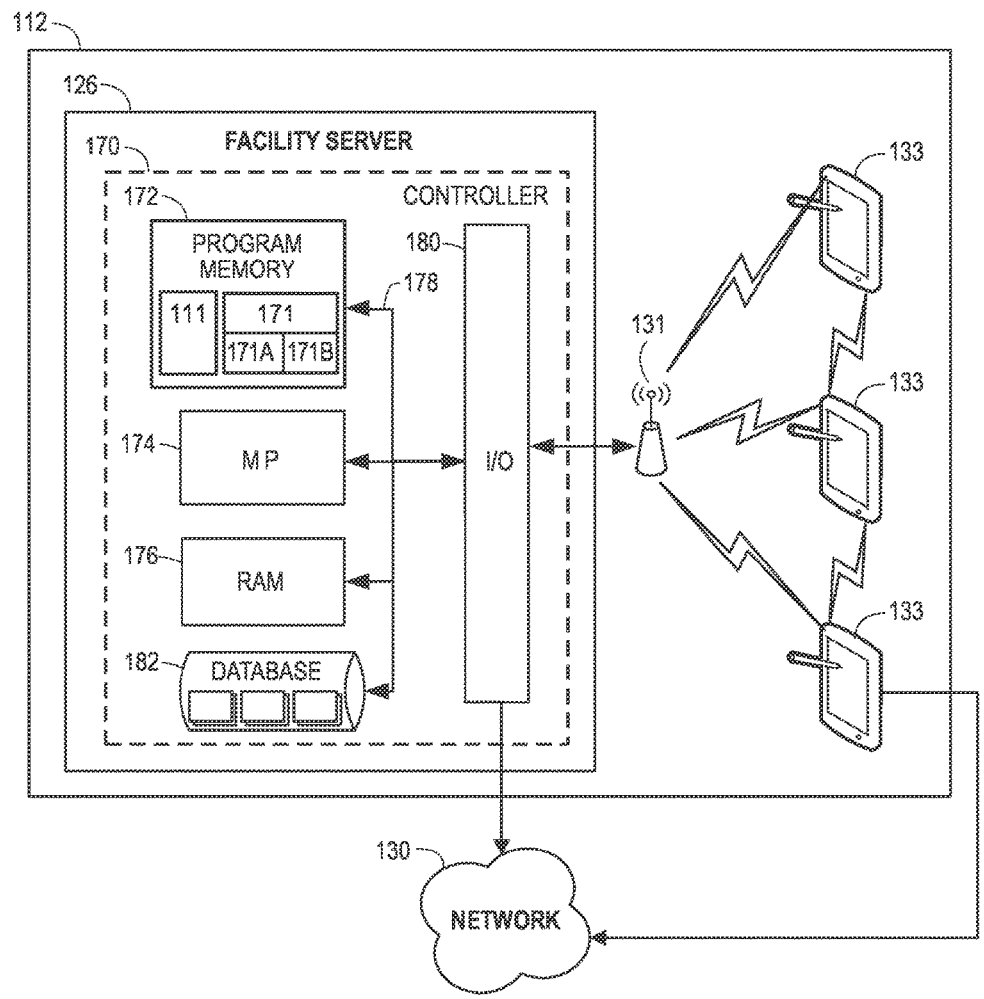

FIGS. 4A and 4B illustrate various aspects of an exemplary architecture for an impact-on-demand platform 100 that may support one or more systems, methods, user interfaces and other techniques described herein. For example, the impact-on-demand platform 100 may include the impact data manager 5 and the impact-on-demand or mapping system 10 of FIG. 1, in an embodiment. The impact-on-demand platform 100 may support the method 450 of FIG. 3, in an embodiment.

The impact-on-demand platform 100 may include both hardware and software applications, as well as various data communications channels for communicating data between the various hardware and software components. The impact-on-demand platform 100 may be roughly divided into front-end components 102 and back-end components 104. The front-end components 102 may primarily (but not necessarily) be disposed within a client network 110 including one or more clients computing devices 112. The client devices 112 may be located, by way of example rather than limitation, in separate geographic locations from each other, including different areas of the same city, different cities, or even different states. The front-end components 102 may additionally comprise a number of workstations 128. The workstations 128 may be local computers or computing devices located in the various locations 112 throughout the network 110 and executing various impact-on-demand/impact data manager applications. In an embodiment, each workstation and local computing device 128 may include an instance of an impact data manager, such as the impact data manager 5 discussed with respect to FIG. 1.

Web-enabled devices 114 (e.g., personal computers, tablets, cellular phones, smart phones, web-enabled televisions, etc.) may be communicatively connected to locations 112 and to the system 140 through a digital network 130 or a wireless router 131. In an embodiment, a web-enabled device 114 may include the user interface 15 of FIG. 1. In an embodiment, the digital network 130 may be the network 25 of FIG. 1.

Returning now to FIG. 4A, those of ordinary skill in the art will recognize that the front-end components 102 may also comprise a plurality of facility servers 126 disposed at the plurality of locations 112 instead of, or in addition to, a plurality of workstations 128, in an embodiment. Each of the locations 112 may include one or more facility servers 126 that may facilitate communications between the web-enabled devices 114 and the back-end components 104 via the digital network 130, described below, and between the terminals 128, 128A of the locations 112 via the digital network 129, and may store information for a plurality of customers/employees/accounts/etc. associated with each facility 112. In an embodiment, each server 126 may include an instance of an impact data manager, such as the impact data manager 5 discussed with respect to FIG. 1.

Of course, a local digital network 184 may also operatively connect each of the workstations 128 to the facility server 126. Unless otherwise indicated, any discussion of the workstations 128 also refers to the facility servers 126, and vice versa. Moreover, environments other than the locations 112, such as the kiosks, call centers, and Internet interface terminals may employ the workstations 128, the web-enabled devices 114, and the servers 126. As used herein, the term "location" refers to any of these points of contact (e.g., call centers, kiosks, Internet interface terminals, etc.) in addition to the locations 112, etc. described above.

The front-end components 102 may communicate with the back-end components 104 via the digital network 130. In embodiment, the digital network 130 may be the network 25 of FIG. 1. One or more of the front-end components 102 may be excluded from communication with the back-end components 104 by configuration or by limiting access due to security concerns. For example, the web enabled devices 114 may be excluded from direct access to the back-end components 104. In some embodiments, the locations 112 may communicate with the back-end components via the digital network 130. In other embodiments, the locations 112 and web-enabled devices 114 may communicate with the back-end components 104 via the same digital network 130, but digital access rights, IP masking, and other network configurations may deny access of the web-enabled devices 114. The web-enabled devices may also connect to the network 130 via the encrypted, wireless router 131.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more web servers 202 (described below), the back-end components 104 may include a central processing system 140 within a central processing facility. In an embodiment, the central processing system 140 may include the mapping or impact-on-demand system 10 of FIG. 1. Of course, the locations 112 may be communicatively connected to different back-end components 104 having one or more functions or capabilities that are similar to the central processing system 140 (e.g., a processing system 141, 142, not shown). The central processing system 140 may include one or more computer processors 162 adapted and configured to execute various software applications and components of the mapping or impact-on-demand system 10.

The central processing system 140 may include a database 146. The database 146 may be adapted to store data related to the operation of the impact-on-demand platform 100, such as client portfolios, business intelligence cubes, mapping rules 28b, and the like. In an embodiment, the database 146 may be the mapping system data storage entity 20 of FIG. 1. The central processing system 140 may access data stored in the database 146 when executing various functions and tasks associated with the operation of the system 100.

Although the impact-on-demand platform 100 is shown to include a central processing system 140 in communication with three locations 112 and various web-enabled devices 114 it should be understood that different numbers of processing systems, locations, and devices may be utilized. For example, the digital network 130 (or other digital networks, not shown) may interconnect the system 100 to a plurality of included central processing systems 140, hundreds of locations 112, and thousands of web-enabled devices 114. According to the disclosed example, this configuration may provide several advantages, such as, for example, enabling near real-time uploads and downloads of information as well as periodic uploads and downloads of information. This provides for a primary backup of all the information generated in the wireless customer data transfer process. Alternatively, some of the locations 112 may store data locally on the facility server 126 and/or the workstations 128.

FIG. 4A also depicts a possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a non-transitory, tangible program memory 160, the processor 162 (may be called a microcontroller or a microprocessor), a non-transitory, tangible random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

FIG. 4B depicts a possible embodiment of the front-end components 102 located in one or more of the client locations 112 from FIG. 4A. Although the following description addresses the design of the locations 112, it should be understood that the design of one or more of the locations 112 may be different from the design of others of the locations 112. Also, each of the locations 112 may have various different structures and methods of operation. It should also be understood that while the embodiment shown in FIG. 4B illustrates some of the components and data connections that may be present in a location 112, it does not illustrate all of the data connections that may be present in a location 112. For exemplary purposes, one design of a location is described below, but it should be understood that numerous other designs may be utilized.

Each of the locations 112 may have one or more tablets or user computing devices 133 and/or a facility server 126. The digital network 184 and wireless router 131 may operatively connect the facility server 126 to the plurality of user devices 133 and/or to other web-enabled devices 114 and workstations 128. The digital network 184 may be a wide area network (WAN), a local area network (LAN), or any other type of digital network readily known to those persons skilled in the art. The digital network 130 may operatively connect the facility server 126, the health tablets 133, the workstations 128, and/or the other web-enabled devices 114 to the central processing system 140.

Each tablet 133, workstation 128, client device terminal 128A, or facility server 126 may include a controller 170.

Similar to the controller 155 from FIG. 4A, the controller 170 may include a non-transitory, tangible program memory 172, a microcontroller or a microprocessor (MP) 174, a non-transitory, tangible random-access memory (RAM) 176, and an input/output (I/O) circuit 180, all of which are interconnected via an address/data bus 178. In some embodiments, the controller 170 may also include, or otherwise be communicatively connected to, a database 182. In an embodiment, the database 182 may be, for example, the data storage entity 30 of FIG. 1.

The database 182 may include data such as customer records, insurer information records, and rules (e.g., the mapping rules 28a described with respect to FIG. 1) and miscellaneous information. As discussed with reference to the controller 155, it should be appreciated that although FIG. 4B depicts only one microprocessor 174, the controller 170 may include multiple microprocessors 174. Similarly, the memory of the controller 170 may include multiple RAMs 176 and multiple program memories 172. Although the FIG. 4B depicts the I/O circuit 180 as a single block, the I/O circuit 180 may include a number of different types of I/O circuits. The controller 170 may implement the RAM(s) 176 and the program memories 172 as semiconductor memories, magnetically readable memories, and/or optically readable memories, for example.

Either or both of the program memories 160 (FIG. 4A) and 172 may also contain machine-readable instructions (i.e., software) 171, for execution within the processors 162 (FIG. 4A) and 174, respectively. The software 171 may perform the various tasks associated with operation of the location or locations, and may be a single module 171 or a plurality of modules 171A, 171B. While the software 171 is depicted in FIGS. 4A and 4B as including two modules, 171A and 171B, the software 171 may include any number of modules accomplishing tasks related to location operation. In an embodiment, the software 171 may include the computer-executable instructions of the intelligence cube module 26 of FIG. 1.

In addition to the controller 170, the tablets 133, the workstations 128 and the other web-enabled devices 114 may further include a user interface such as the user interface 15 of FIG. 1. In an embodiment, the user interface may include a display and a keyboard as well as a variety of other input/output devices (not shown) such as a scanner, printer, mouse, touch screen, track pad, track ball, isopoint, voice recognition system, digital camera, bar code scanner, RFID reader, bio-identifier, etc. A location employee may sign on and occupy each tablet 133, workstation 128 or client device terminal 128A to assist the employee in performing his or her duties. Employees may sign onto the tablet 133, workstation 128 or the client device terminal 128A using any available technique, such as entering a user name and password. If an employee signs on to the system using a tablet 133, the network 184 may communicate this information to the facility server 126, so that the controller 170 may identify which employees are signed onto the system 100 and which tablet 133, workstation 128 or client device terminal 128A the employee is signed onto.

Various software applications resident in the front-end components 102 and the back-end components 104 may implement functions related to location and mapping operations, and provide various user interface means to allow users to access the system 100. One or more of the front-end components 102 and/or the back-end components 104 may include a user-interface application 111 for allowing a user to input and view data associated with the system 100, and to interact with the impact-on-demand platform 100. The user-interface application 111 may, for example, be in communicative connection with the intelligence cube module 26, or may be a part of the intelligence cube module 26. In an embodiment, the user interface application 111 is a web browser client, and the facility server 126 or the central processing system 140 implements a server application 113 for providing data to the user interface application 111. However, the user interface application 111 may be any type of interface, including a proprietary interface, and may communicate with the facility server 126 or the central processing system 140 using any type of protocol including, but not limited to, file transfer protocol (FTP), telnet, 32 hypertext-transfer protocol (HTTP), etc. Moreover, some embodiments may include the user interface application 111 running on one of the web-enabled devices 114 (as when a patient is accessing the system), while other embodiments may include the application 111 running on the tablet 133 in a location 112. The central processing system 140 and/or the facility server 126 may implement any known protocol compatible with the user-interface application 111 running on the tablets 133, the workstations 128 and the web-enabled devices 114 and adapted to the purpose of receiving and providing the necessary information during the wireless data transfer process.

Figure 4C:
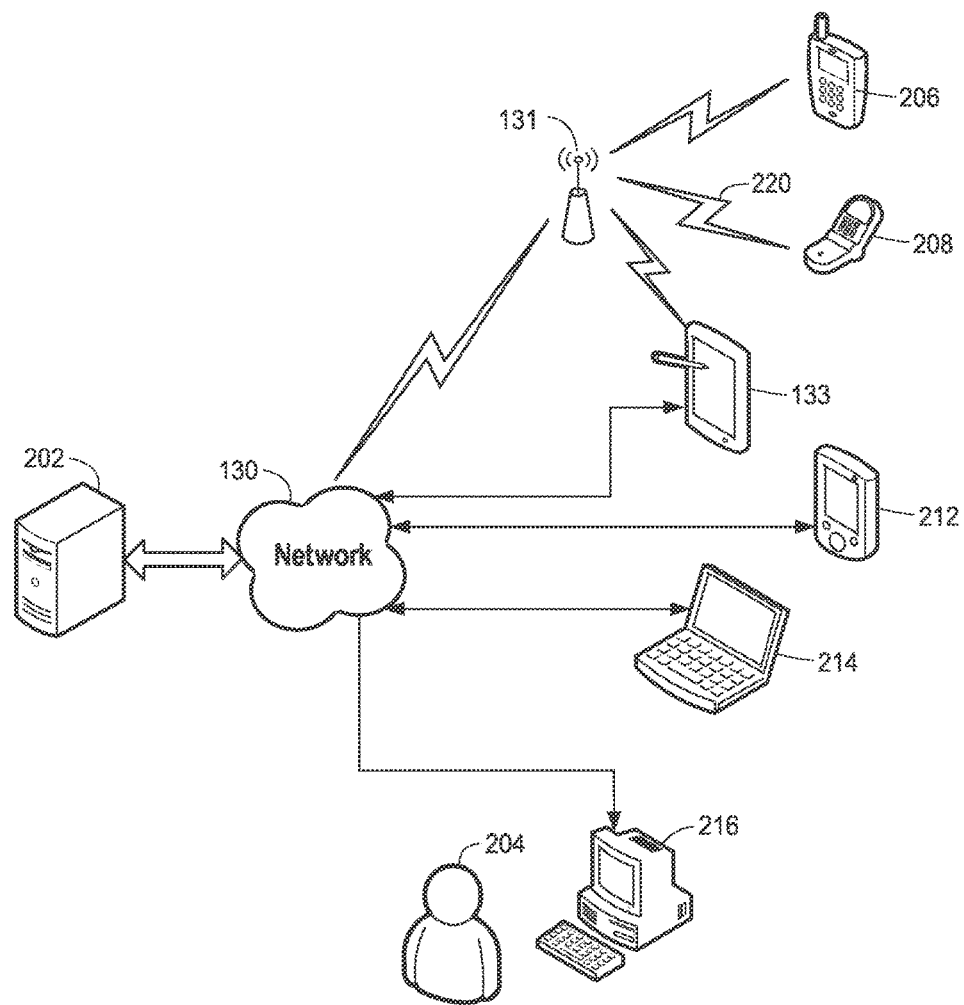

For purposes of implementing the impact-on-demand platform 100, the user may interact with location systems (e.g., the central processing system 140) via a plurality of web pages. FIG. 4C depicts a web server 202 connected via the network 130 to a plurality of tablets 133 and other web-enabled devices through which a user 204 may initiate and interact with the impact-on-demand platform 100. The web enabled devices may include, by way of example, a smart phone or device 206, a web-enabled cell phone 208, a tablet computer 133, a personal digital assistant (PDA) 212, a laptop computer 214, a desktop computer 216, a portable media player (not shown), etc. Of course, any web-enabled device appropriately configured may interact with the impact-on-demand platform 100. The web-enabled devices 133 and 206-216 need not necessarily communicate with the network 130 via a wired connection. In some instances, the web enabled devices 133 and 206-216 may communicate with the network 130 via wireless signals 220 and, in some instances, may communicate with the network 130 via an intervening wireless or wired device 131, which may be a wireless router, a wireless repeater, a base transceiver station of a mobile telephony provider, etc. Each of the web-enabled devices 133 and 206-216 may interact with the web server 202 to receive web pages, such as the web page 222 depicted in FIG. 4C, for display on a display associated with the web-enabled device 133 and 206-216. It will be appreciated that although only one web server 202 is depicted in FIG. 4C, multiple web servers 202 may be provided for the purpose of distributing server load, serving different web pages, implementing different portions of the location web interface, etc.

Figure 4D:
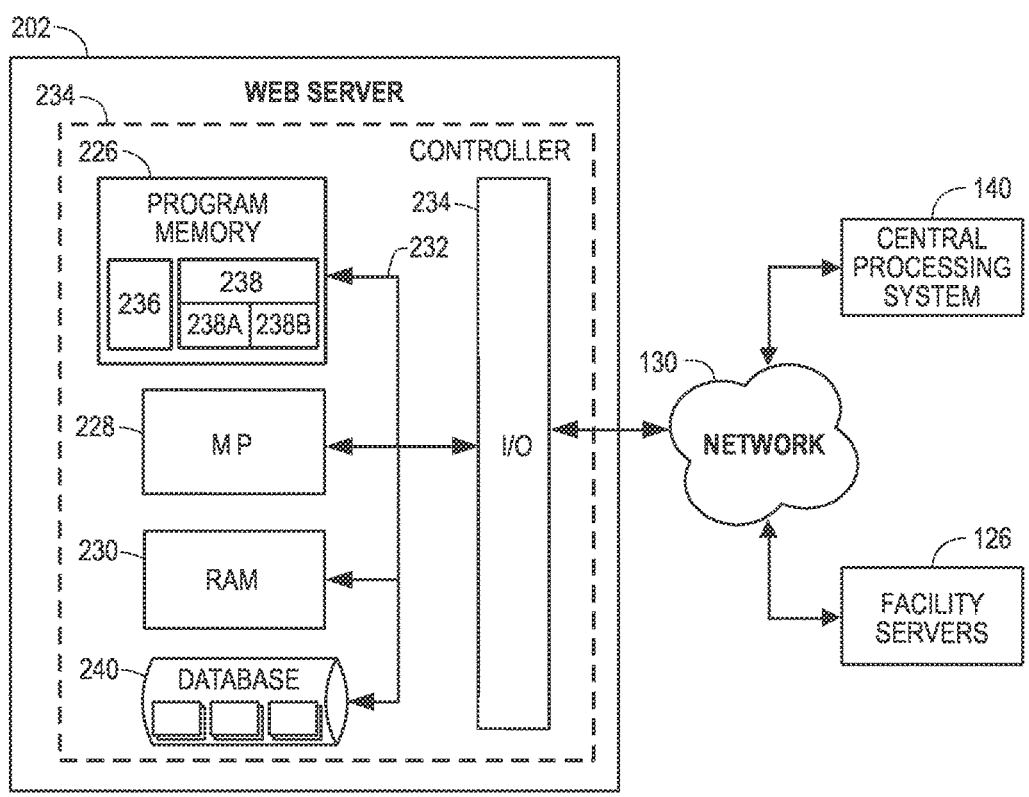

Turning now to FIG. 4D, the web server 202, like the facility server 126, may include a controller 234. Similar to the controllers 155 and 170, the controller 234 may include a non-transitory, tangible program memory 226, a microcontroller or a microprocessor (MP) 228, a non-transitory, tangible random-access 33 memory (RAM) 230, and an input/output (I/O) circuit 234, all of which may be interconnected via an address/data bus 232. In some embodiments, the controller 234 may also include, or otherwise be communicatively connected to, a database 240 or other data storage mechanism (e.g., one or more hard disk drives, optical storage drives, solid state storage devices, etc.). The database 240 may include data such as customer web profiles, product data, web page templates and/or web pages, and other data necessary to interact with the user 204 through the network 130. As discussed with reference to the controllers 155 and it should be appreciated that although FIG. 4D depicts only one microprocessor 228, the controller 224 may include multiple microprocessors 228. Similarly, the memory of the controller 224 may include multiple non-transitory, tangible RAMs 230 and multiple non-transitory, tangible program memories 226. Although the FIG. 4D depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the user devices 133 and 206-216, as depicted in FIG. 4C, FIG. 4D illustrates that the web server 202 may also be connected through the network 130 to the central processing system 140 and/or one or more facility servers 126. As described below, connection to the central processing system 140 and/or to the one or more facility servers 126 facilitates the impact-on-demand platform 100.

The program memory 226 and/or the RAM 230 may store various applications for execution by the microprocessor 228. For example, an application 236 may provide a user interface to the server, which user interface may, for example, allow a network administrator to configure, troubleshoot, or test various aspects of the server's operation, or otherwise to access information thereon. A server application 238 may operate to populate and transmit web pages to the web-enabled devices 206-216, receive information from the user 204 transmitted back to the server 202, and forward appropriate data to the central processing system 140 and the facility servers 126, as described below. Like the software the server application 238 may be a single module 238 or a plurality of modules 238A, 238B. In an embodiment, the module 238 or the modules 238A, 238B may include at least a portion of the computer-executable instructions for the intelligence cube module 26 of FIG. 1.

While the server application 238 is depicted in FIG. 4D as including two modules, 238A and 238B, the server application 238 may include any number of modules accomplishing tasks related to implantation of the web server 202. By way of example, the module 238A may populate and transmit the web pages and/or may receive and evaluate inputs from the user 204 to facilitate in the wireless transfer of data from a first tablet to a second tablet, while the module 238B may communicate with one or more of the back end components 104 to provide the requested data.

Typically, a user may launch or instantiate a user interface application (e.g., a web browser or other client application) from a web-enabled device, such as the web-enabled devices 133 and 206-216, to access the web server 202 cooperating with the system 140 to implement the impact-on-demand platform 100.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A system for mapping data associated with one or more impact events to at least one client insurance portfolio, the system comprising:
   processing circuitry;
   a non-transitory database storage region; and
   a non-transitory computer readable memory coupled to the processing circuitry, the memory storing machine-executable instructions, wherein the machine-executable instructions, when executed on the processing circuitry, cause the processing circuitry to
      receive, from remote computing devices of one or more data sources via a network,
         source data including characteristics of one or more insured properties in each of a plurality of client insurance portfolios, and
         risk information indicating geographic patterns of one or more impact events affecting the one or more insured properties,
      store, within the non-transitory database storage region, the source data,
      determine, based on the source data stored in the non-transitory database storage region, a plurality of dimensions and one or more limits for customizing a business intelligence cube definition at a business intelligence cube user interface screen, wherein
         the plurality of dimensions corresponds to a plurality of data fields in a portfolio of the plurality of client insurance portfolios, and
         the one or more limits correspond to one or more boundary conditions for each of at least a portion of the plurality of data fields in the portfolio,
      enable, dynamically in real-time based on analysis of source data corresponding to each data field of at least a portion of the plurality of data fields in the portfolio in view of an impact event of the one or more impact events, one or more functional properties of the business intelligence cube user interface screen, wherein
         each functional property corresponds to one of a respective data field of the plurality of data fields, a respective menu option, and a respective calculation,
      receive, via the business intelligence cube user interface screen responsive to interaction of a user with at least one of the one or more functional properties, selections of at least one of a portion of the plurality of dimensions and updated values of at least one limit of the one or more limits,
      generate, in real-time responsive to receiving the selections at the business intelligence cube user interface screen, a business intelligence cube definition for the portfolio with respect to the impact event based in part on the selections, and
      customize, in real-time responsive to receiving a user request, a business intelligence cube based on the business intelligence cube definition, wherein
         customizing the business intelligence cube includes populating the business intelligence cube with a portion of the source data corresponding to a portion of the portfolio affected by the impact event, and respective risk information for the impact event.

2. The system of claim 1, wherein the machine-executable instructions, when executed on the processing circuitry, further cause the processing circuitry to:

adjust, dynamically in real-time responsive to receiving the selections, the plurality of dimensions and the one or more limits available for selection.

3. The system of claim 1, wherein the machine-executable instructions, when executed on the processing circuitry, further cause the processing circuitry to:

update, dynamically in real-time responsive to receiving the selections, a visual representation of the business intelligence cube definition displayed within the business intelligence cube user interface screen to reflect the selections.

4. The system of claim 3, wherein updating the visual representation of the business intelligence cube definition includes updating at least one of geocoded locations, geographical shading on a map, and risk model representations based on the received selections.

5. The system of claim 1, wherein enabling the one or more functional properties of the business intelligence cube user interface screen includes adjusting, based on the selections, one or more display choices available within at least one displayed menu on the business intelligence cube user interface screen.

6. The system of claim 1, wherein the machine-executable instructions, when executed on the processing circuitry, further cause the processing circuitry to:

validate, based on a set of validation rules stored in the non-transitory data storage region, the selections for the business intelligence cube definition.

7. The system of claim 6, wherein the set of validation rules is based on at least one of characteristics, data field boundaries, and data field contents of the portfolio.

8. The system of claim 6, wherein validating the selections comprises detecting an error in the business intelligence cube definition including at least one of an anomaly, an inconsistency, or an incompatibility in at least one of the one or more dimensions and the one or more limits.

9. The system of claim 8, wherein the machine-executable instructions, when executed on the processing circuitry, further cause the processing circuitry to:

correct, automatically in response to detecting the error in the business intelligence cube definition, the at least one of the anomaly, the inconsistency, or the incompatibility in the at least one of the plurality of dimensions and the one or more limits.

10. The system of claim 9, wherein correcting the at least one of the anomaly, the inconsistency, or the incompatibility includes adjusting source data associated with the detected error.

11. The system of claim 1, wherein the plurality of dimensions include at least one of data fields, columns, headers, syntax rules, and data tags within the portfolio.

12. The system of claim 1, wherein the one or more limits include at least one of boundary conditions for a data membership set, a geographical area, and an equivalence function.

13. The system of claim 1, wherein the source data includes at least one of maps data, risk management assessment data, and real property data for the one or more insured properties associated with the portfolio.

14. The system of claim 1, wherein the machine-executable instructions, when executed on the processing circuitry, further cause the processing circuitry to:

output, in real-time responsive to receiving the user request, one or more on-demand reports based on population of the business intelligence cube with the source data from the portion of the portfolio and the respective risk information for the impact event.

15. The system of claim 14, wherein the one or more on-demand reports include at least one of predicted or estimated loss reports, damage reports, and replacement cost reports.

16. The system of claim 1, wherein the machine-executable instructions, when executed on the processing circuitry, further cause the processing circuitry to:

output, in real-time responsive to receiving the user request, the business intelligence cube definition to the business intelligence cube user interface screen based on the portion of the portfolio and the respective risk information for the impact event.

17. A system comprising a plurality of subsystems for mapping data associated with an impact event to at least one client insurance portfolio, the system comprising:

a non-transitory storage region configured to store source data received from one or more data sources via a network;

a data management subsystem comprising first processing circuitry for executing instructions stored to a first non-transitory computer-readable medium, the data management subsystem configured to receive, from remote computing devices of one or more data sources via a network, source data including characteristics of one or more insured properties in each of a plurality of client insurance portfolios and risk information indicating geographic patterns of one or more impact events affecting the one or more insured properties, receive, from a remote computing device via the network through a user interface screen, selections of one or more dimensions of a plurality of dimensions, and updated values of at least one limit of one or more limits for a business intelligence cube definition for a portfolio of the plurality of client insurance portfolios, wherein the plurality of dimensions correspond to a plurality of data field categories in a respective client insurance portfolio, and the one or more limits correspond to boundary conditions for the data field categories in the portfolio, and validate, in real-time responsive to receiving the selections at the user interface screen, the selections using a set of validation rules stored in the non-transitory storage region; and a mapping subsystem comprising second processing circuitry for executing instructions stored to a second non-transitory computer-readable medium, the mapping subsystem configured to enable, dynamically in real-time based on analysis of data field types within the source data for at least one of the portfolio and an impact event of the one or more impact events, one or more functional properties of the user interface screen, wherein each functional property corresponds to one of a respective data field of the plurality of data fields, a respective menu option, and a respective calculation, and the selections are entered by the user via at least one of the one or more functional properties, generate, in real-time responsive to receiving the selections, the business intelligence cube definition for the portfolio with respect to the impact event, and customize, in real-time responsive to receiving a user request, a business intelligence cube based on the business intelligence cube definition, wherein customizing the business intelligence cube includes populating the business intelligence cube with a portion of the source data corresponding to a portion of the portfolio affected by the impact event and respective risk information for the impact event.

18. The system of claim 17, wherein the mapping subsystem is further configured to:

adjust, dynamically in real-time responsive to receiving the selections, the plurality of dimensions and the one or more limits available for selection.

19. The system of claim 17, wherein the mapping subsystem is further configured to:

update, dynamically in real-time responsive to receiving the selections, a visual representation of the business intelligence cube definition displayed within the user interface screen to reflect the selections.

20. The system of claim 19, wherein updating the visual representation of the business intelligence cube definition includes updating at least one of geocoded locations, geographical shading on a map, and risk model representations, based on the selections.

* * * * *